(12) United States Patent
Weber et al.

(10) Patent No.: US 7,356,633 B2
(45) Date of Patent: *Apr. 8, 2008

(54) COMPOSING ON-CHIP INTERCONNECTS WITH CONFIGURABLE INTERFACES

(75) Inventors: Wolf-Dietrich Weber, San Jose, CA (US); Chien-Chun Chou, San Jose, CA (US); Nabil N. Masri, Sunnyvale, CA (US); Michael Jude Meyer, Palo Alto, CA (US); Thomas Wayne O'Connell, San Jose, CA (US); Kamil Synek, Sunnyvale, CA (US); Jay Scott Tomlinson, San Jose, CA (US); Drew Eric Wingard, San Carlos, CA (US)

(73) Assignee: Sonics, Inc., Milpitas, CA (US)

( * ) Notice: Subject to any disclaimer, the term of this patent is extended or adjusted under 35 U.S.C. 154(b) by 799 days.

This patent is subject to a terminal disclaimer.

(21) Appl. No.: 10/138,946

(22) Filed: May 3, 2002

(65) Prior Publication Data

US 2003/0208566 A1 Nov. 6, 2003

(51) Int. Cl.
*G06F 13/00* (2006.01)
(52) U.S. Cl. ...................... 710/306; 370/401
(58) Field of Classification Search ............... 710/62, 710/65, 306; 370/401; 712/35
See application file for complete search history.

(56) References Cited

U.S. PATENT DOCUMENTS

| | | | |
|---|---|---|---|
| 5,495,605 A | 2/1996 | Cadot | |
| 5,923,860 A * | 7/1999 | Olarig | 710/306 |
| 5,948,089 A | 9/1999 | Wingard et al. | |
| 5,987,541 A * | 11/1999 | Hewitt | 710/65 |
| 6,034,542 A * | 3/2000 | Ridgeway | 326/39 |
| 6,041,400 A * | 3/2000 | Ozcelik et al. | 712/35 |
| 6,061,730 A | 5/2000 | Billings | |
| 6,122,664 A | 9/2000 | Boukobza et al. | |
| 6,182,183 B1 | 1/2001 | Wingard et al. | |
| 6,253,243 B1 | 6/2001 | Spencer | |
| 6,330,225 B1 | 12/2001 | Weber et al. | |
| 6,336,138 B1 | 1/2002 | Caswell et al. | |

(Continued)

FOREIGN PATENT DOCUMENTS

EP 1 376 932 A2 1/2004

(Continued)

OTHER PUBLICATIONS

Hadjitheodosiou, M.H. et al., "Broadband Access Via Satellite", computer Networks, Elsevier Science Publishers B.V., Amsterdam, NL, vol. 31, No. 4, Feb. 25, 1999, pp. 353-378.

(Continued)

*Primary Examiner*—Glenn A. Auve
(74) *Attorney, Agent, or Firm*—Rutan & Tucker, LLP

(57) ABSTRACT

Embodiments of apparatuses, systems, and methods are described for composing on-chip interconnects with configurable interfaces. A configurable interface includes a configurable agent and interface port. The configurable agent has a first input and a first output with the first input receiving a first communication. An input of a core receives the configurable agent's first output. The agent is configured for important inter-network characteristics such as topology, flooding control, clocking/reset, and performance enhancement.

42 Claims, 17 Drawing Sheets

U.S. PATENT DOCUMENTS

| | | |
|---|---|---|
| 6,539,225 B1 | 3/2003 | Lee |
| 6,549,516 B1 | 4/2003 | Albert et al. |
| 6,571,286 B2 | 5/2003 | Fisher et al. |
| 6,578,117 B2 | 6/2003 | Weber |
| 6,654,798 B1 | 11/2003 | Skibinski et al. |
| 6,671,724 B1 | 12/2003 | Pandya et al. |
| 6,683,474 B2 | 1/2004 | Ebert et al. |
| 6,718,416 B1 * | 4/2004 | Self et al. .................. 710/302 |
| 6,721,793 B1 | 4/2004 | Corless |
| 6,725,313 B1 | 4/2004 | Wingard et al. |
| 6,766,406 B1 * | 7/2004 | Gasperini et al. .......... 710/315 |
| 6,775,719 B1 | 8/2004 | Leitner et al. |
| 6,785,256 B2 | 8/2004 | O'Neill |
| 6,785,753 B2 | 8/2004 | Weber et al. |
| 6,795,857 B1 | 9/2004 | Leung et al. |
| 6,804,738 B2 | 10/2004 | Weber |
| 6,804,757 B2 | 10/2004 | Weber |
| 6,816,814 B2 | 11/2004 | Ebert et al. |
| 6,831,916 B1 | 12/2004 | Parthasarathy et al. |
| 6,859,931 B1 | 2/2005 | Cheyer et al. |
| 6,880,133 B2 | 4/2005 | Meyer et al. |
| 6,948,004 B2 | 9/2005 | Gasbarro et al. |
| 6,961,834 B2 | 11/2005 | Weber |
| 6,976,106 B2 | 12/2005 | Tomlinson et al. |
| 7,120,712 B2 | 10/2006 | Wingard et al. |
| 2002/0046260 A1 | 4/2002 | Day, II |
| 2002/0073338 A1 * | 6/2002 | Burrows et al. ............ 713/201 |
| 2002/0138287 A1 | 9/2002 | Chen et al. |
| 2002/0138615 A1 | 9/2002 | Schmeling |
| 2002/0141401 A1 | 10/2002 | Albert et al. |
| 2002/0143653 A1 | 10/2002 | DiLena et al. |
| 2002/0169854 A1 * | 11/2002 | Tarnoff ....................... 709/219 |
| 2002/0184300 A1 | 12/2002 | Schmeling et al. |
| 2003/0018738 A1 * | 1/2003 | Boylan et al. .............. 709/213 |
| 2003/0069960 A1 | 4/2003 | Symons et al. |
| 2003/0074520 A1 | 4/2003 | Weber |
| 2003/0126192 A1 | 7/2003 | Magnussen |
| 2003/0158994 A1 | 8/2003 | Moy |
| 2003/0167144 A1 * | 9/2003 | Wang et al. ................ 702/119 |
| 2003/0208566 A1 | 11/2003 | Weber et al. |
| 2003/0208611 A1 | 11/2003 | Weber et al. |
| 2004/0015961 A1 | 1/2004 | Chefalas et al. |
| 2004/0223501 A1 * | 11/2004 | Mackiewich et al. ....... 370/401 |

FOREIGN PATENT DOCUMENTS

| | | |
|---|---|---|
| EP | 03728644 | 8/2005 |
| WO | WO 95/34153 | 12/1995 |
| WO | WO 99/63727 | 12/1999 |
| WO | WO 02/13024 A1 * | 2/2002 |

OTHER PUBLICATIONS

PCT International Search Report No. PCT/US03/13640, 6 pages, mailed Aug. 8, 2003.

Cottrell, Donald, Chapter 78: "Design Automation Technology Roadmap", The VLSI Handbook, Copyright 2000, 41 Pages.

Gupta, Sumit and Gupta, Rajesh K., Chapter 64: "ASIC Design", The VLSI Handbook, Copyright 2000, 29 pages.

Hurst, Stanley L., Chapter 5: "Computer Aided Design", VLSI Custom Microelectronics: Digital, Analog, and Mixed-Signal, Copyright 1999, 95 pages.

* cited by examiner

Table 1A

| Forward Control-Path Signals: Bridge Agent C1 | | | | |
|---|---|---|---|---|
| Input Control-Path Signals | | Output Control-Path Signals | | Action |
| Signal 110 | Signal 111 | Signal 109 | Signal 112 | |
| 0 | 0 | 0 | 0 | none |
| 0 | 1 | 1 | 0 | forward internal signal (on the Wire-Or Signal 3 line) to the external bridge agent A2 |
| 1 | 0 | 0 | 1 | forward external signal from bridge agent A2 to the internal Wire-Or Signal 3 line |
| 1 | 1 | 0 | 1 | forward the external signal from bridge agent A2 to the internal Write-Or Signal 3 line, and no loop back to Signal 109 |

Table 1B

| Forward Control-Path Signals: Bridge Agent A2 | | | | |
|---|---|---|---|---|
| Input Control-Path Signals | | Output Control-Path Signals | | Action |
| Signal 109 | Signal 108 | Signal 110 | Signal 107 | |
| 0 | 0 | 0 | 0 | none |
| 0 | 1 | 1 | 0 | forward internal signal (on the Wire-Or Signal 1 line) to the external bridge agent C1 |
| 1 | 0 | 0 | 1 | forward external signal from bridge agent C1 to the internal Wire-Or Signal 1 line |
| 1 | 1 | 0 | 1 | forward the external signal from bridge agent C1 to the internal Write-Or Signal 1 line, and no loop back to Signal 110 |

FIG. 10A

Table 1C

| Forward Control-Path Signals: Bridge Agent A1 | | | | |
|---|---|---|---|---|
| Input Control-Path Signals | | Output Control-Path Signals | | Action |
| Signal 103 | Signal 106 | Signal 104 | Signal 105 | |
| 0 | 0 | 0 | 0 | none |
| 0 | 1 | 1 | 0 | forward internal signal (on the Wire-Or Signal 1 line) to the external bridge agent B1 |
| 1 | 0 | 0 | 1 | forward external signal from bridge agent B1 to the internal Wire-Or Signal 1 line |
| 1 | 1 | 0 | 1 | forward the external signal from bridge agent B1 to the internal Write-Or Signal 1 line, and no loop back to Signal 104 |

Table 1D

| Forward Control-Path Signals: Bridge Agent B1 | | | | |
|---|---|---|---|---|
| Input Control-Path Signals | | Output Control-Path Signals | | Action |
| Signal 104 | Signal 101 | Signal 103 | Signal 102 | |
| 0 | 0 | 0 | 0 | none |
| 0 | 1 | 1 | 0 | forward internal signal (on the Wire-Or Signal 2 line) to the external bridge agent A1 |
| 1 | 0 | 0 | 1 | forward external signal from bridge agent A1 to the internal Wire-Or Signal 2 line |
| 1 | 1 | 0 | 1 | forward the external signal from bridge agent A1 to the internal Write-Or Signal 2 line, and no loop back to Signal 103 |

FIG. 10B

Table 2

| Section Name | Configuration Name | Description |
|---|---|---|
| Topology and Flooding Control | bridge_agent | "yes": means that this agent is a bridge agent<br>"no": means that this agent is not a bridge agent |
| | bridge_forward | "yes": means that a bridge agent always forwards internal requests to its external interface port<br>"no": means that a bridge agent forwards internal requests selectively |
| Clocking and Reset | clock_rate | A value to indicate the operating clock rate of a bridge agent's upstream on-chip interconnect, comparing to the agent's own interconnect |
| | reset_into_X | This is an interface port configuration parameter. Assume that a bridge agent X is connected to an external bridge agent Y through the use of an interface port. A "yes" of the parameter means that an incoming reset signal exists in the interface port of the bridge agent X. The reset signal is driven by the bridge agent Y, and an assertion on the reset signal indicates that the agent Y is in reset mode. A "no" means there is no incoming reset signal for the bridge agent X. |
| Inter-Network Performance Enhancement | performance_enhance | "yes": means that a bridge agent will use its performance enhancement logic at run-time.<br>"no": means no performance enhancement will be triggered. |
| Performance Optimization for Single Pipeline Interconnects | phase2phase_delay | A value represents either a static or dynamic performance context information that defines the delay cycle time between two consecutive phases of a transaction. |
| | max_req2data_delay | A value represents the maximum cycle time apart between receiving a write request's command and the request's write data. |
| | min_arb2data_delay | A value represents the minimum cycle time apart between a write request's arbitration cycle and write data cycle. |
| | min_req2resp_delay | A value represent the minmum cycle time apart between a request's acceptance to the receiving of the response of the request. |
| | max_outstanding_reqs | A value represent the maximum number of requests that can be outstanding (i.e., their responses are not returned yet). |

FIG. 16

(12) United States Patent
US 7,356,633 B2

COMPOSING ON-CHIP INTERCONNECTS WITH CONFIGURABLE INTERFACES

FIELD OF THE INVENTION

The present invention pertains to on-chip communications. More particularly, the present invention relates to a method and apparatus for composing on-chip interconnects with configurable interfaces.

BACKGROUND OF THE INVENTION

In computer networks, internetworking of homogeneous and/or different networks, tightly coupled and loosely coupled, has been studied and put into practice for many years. With the advance in integrated circuit technology, on-chip interconnects have emerged rapidly and the aggregation of multiple on-chip interconnects into a single, larger on-chip network has attracted interest. Few schemes have been proposed with respect to this matter—with most of the schemes addressing only the connection of non-configurable on-chip interconnects using hard-wired, fixed gateway modules. The hard-wired approach may not meet the requirements of applications demanding optimum area size, best performance, and low power. Instead, the use of configurable interfaces may provide a solution in this area.

BRIEF DESCRIPTION OF THE DRAWINGS

The present invention is illustrated by way of example and not limitation in the figures of the accompanying drawings, in which like references indicate similar elements and in which:

FIGS. 10A and 10B illustrate embodiments of the present invention showing how a bridge agent forwards control-path signals;

FIG. 16 illustrates one embodiment of the present invention showing, in table form, a definition of some possible configuration parameters.

DETAILED DESCRIPTION

A method and apparatus for composing on-chip interconnects with configurable interfaces are described, as is a composing methodology that makes use of configurable interfaces of on-chip interconnects to integrate multiple on-chip interconnects.

Figure 1:
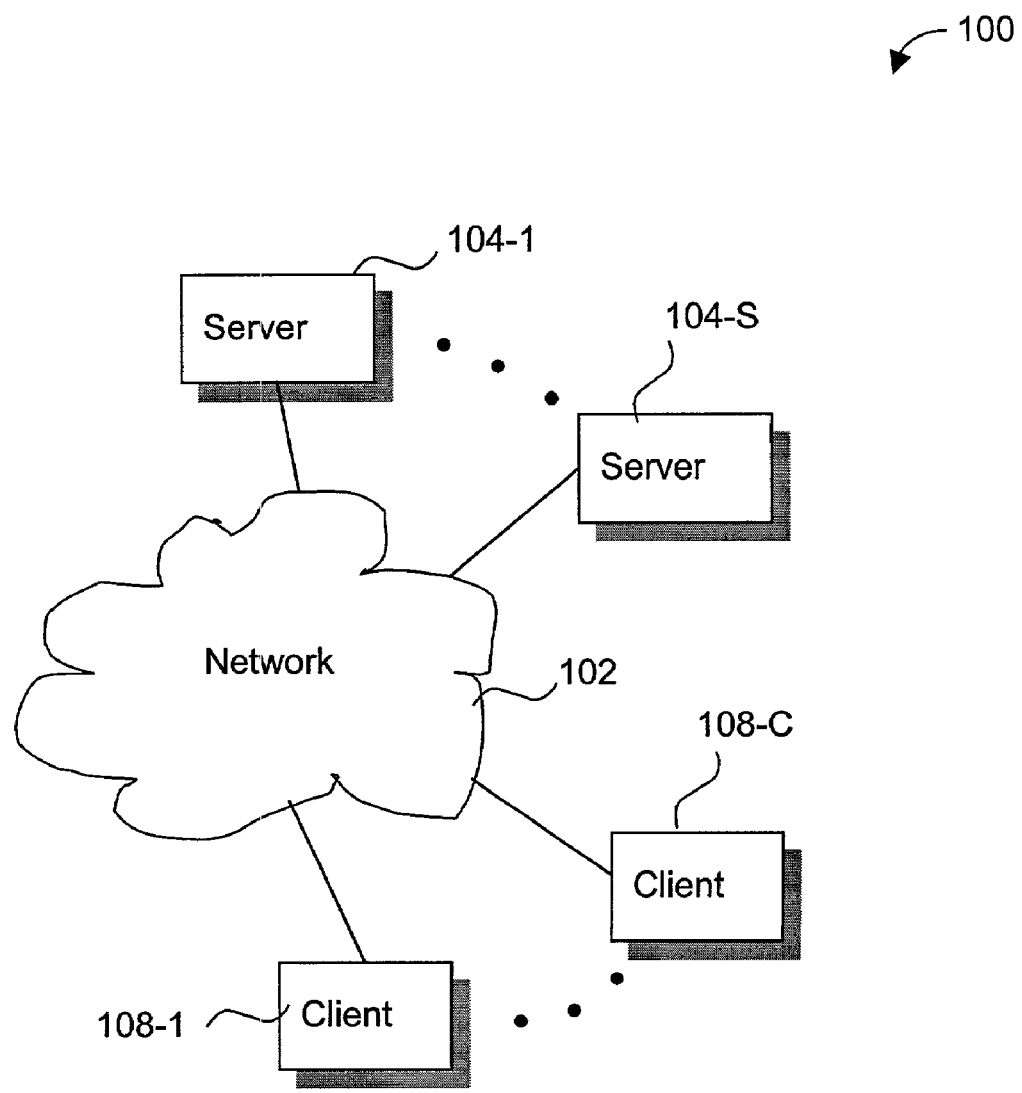
FIG. 1 illustrates a network environment in which the method and apparatus of the present invention may be implemented.

FIG. 1 illustrates a network environment 100 in which the techniques described may be applied. The network environment 100 has a network 102 that connects S servers 104-1 through 104-S, and C clients 108-1 through 108-C. More details are described below.

Figure 2:
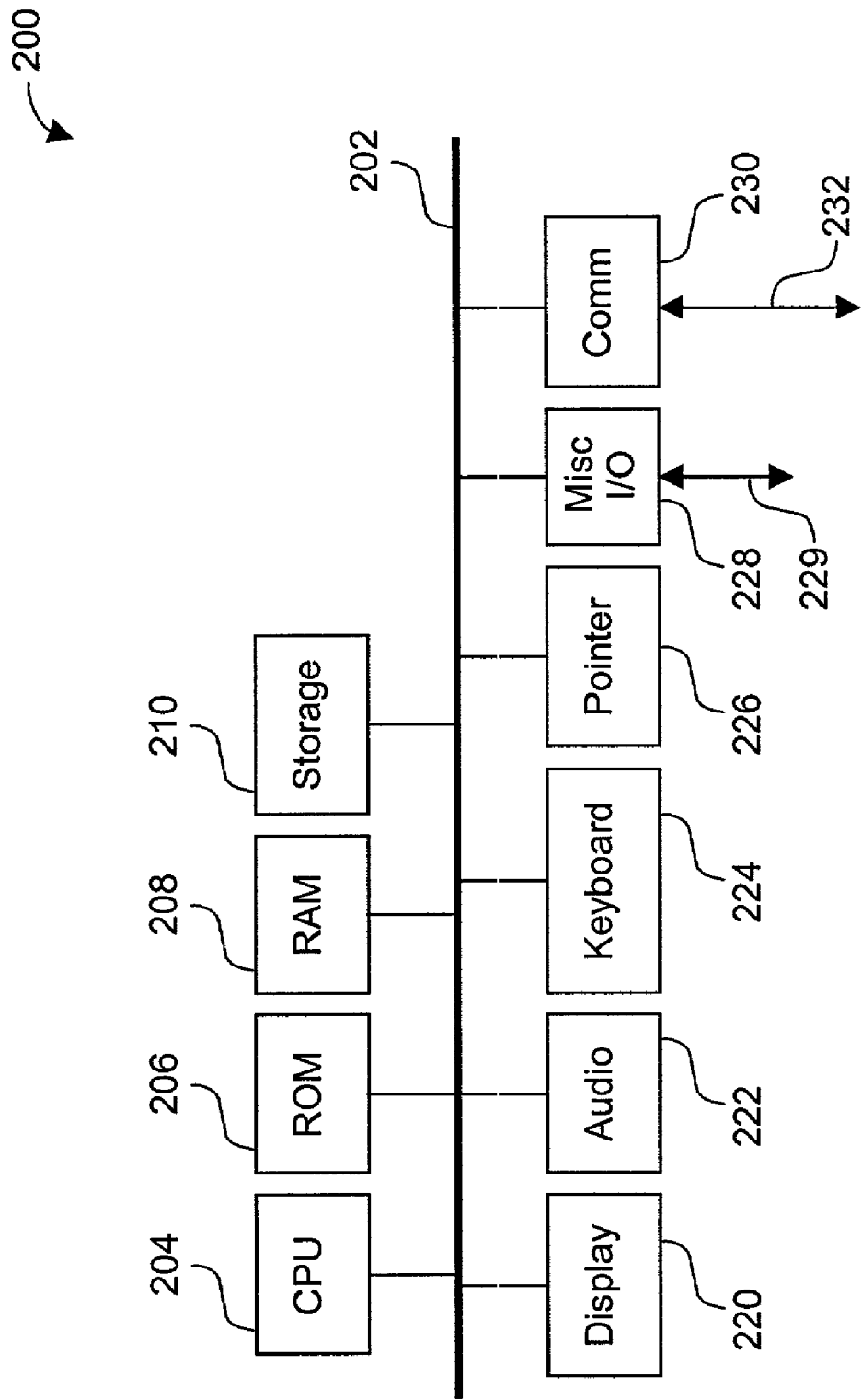
FIG. 2 is a block diagram of a computer system.

FIG. 2 illustrates a computer system 200 in block diagram form, which may be representative of any of the clients and/or servers shown in FIG. 1. More details are described below.

The term IP as used in this document denotes Intellectual Property. The term IP may be used by itself, or may be used with other terms such as core, to denote a design having a functionality. For example, an IP core, or IP for short, may consist of circuitry, buses, communication links, a microprocessor, etc. Additionally, IP may be implemented in a variety of ways, and may be fabricated on an integrated circuit, etc. The term flooding is used to denote a communication in which an incoming packet is duplicated and sent out on every outgoing way throughout most of a chip, system, etc.

Figure 3:
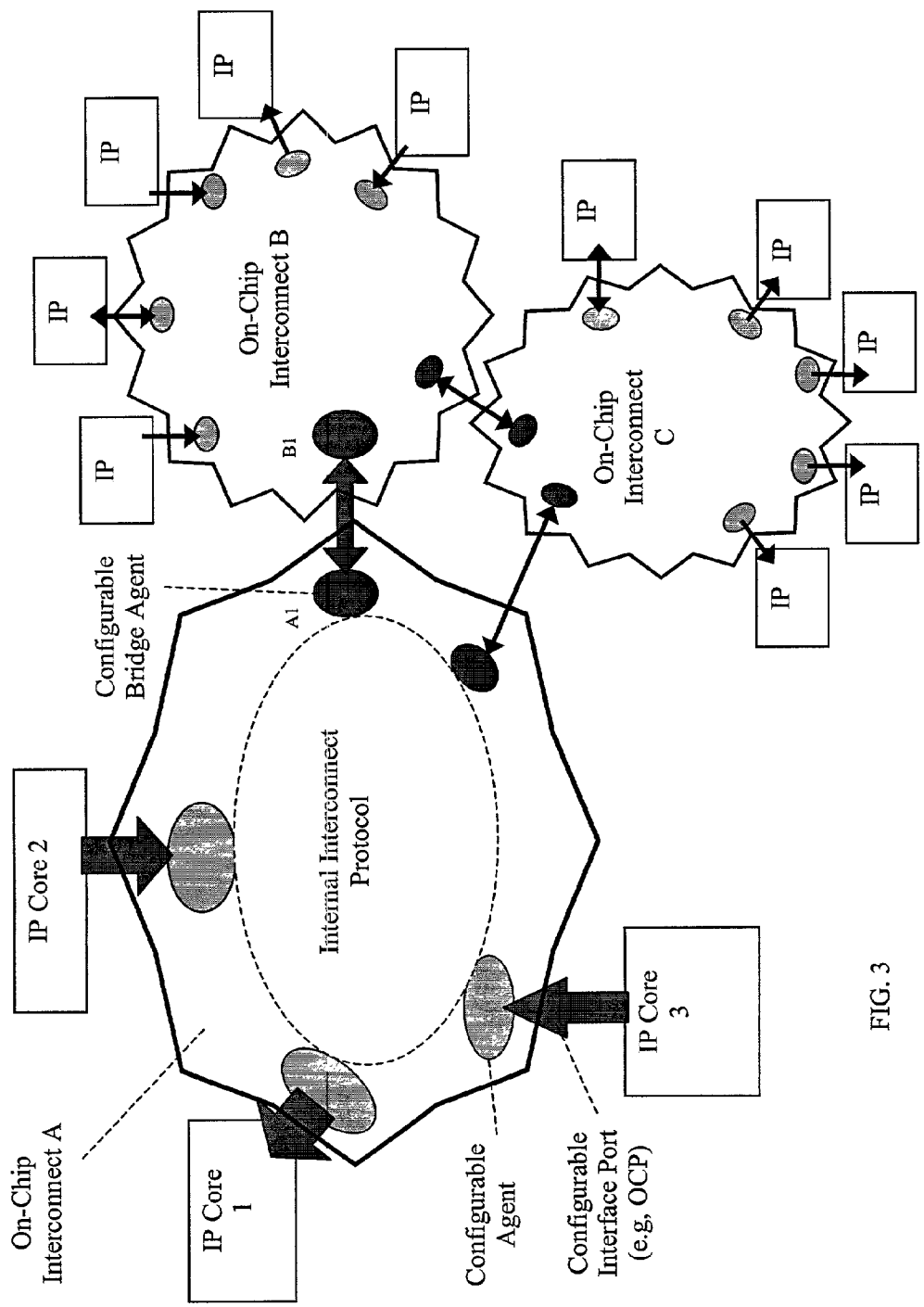
FIG. 3 illustrates one embodiment of the present invention showing composing multiple on-chip interconnects with configurable interfaces.
Figure 4:
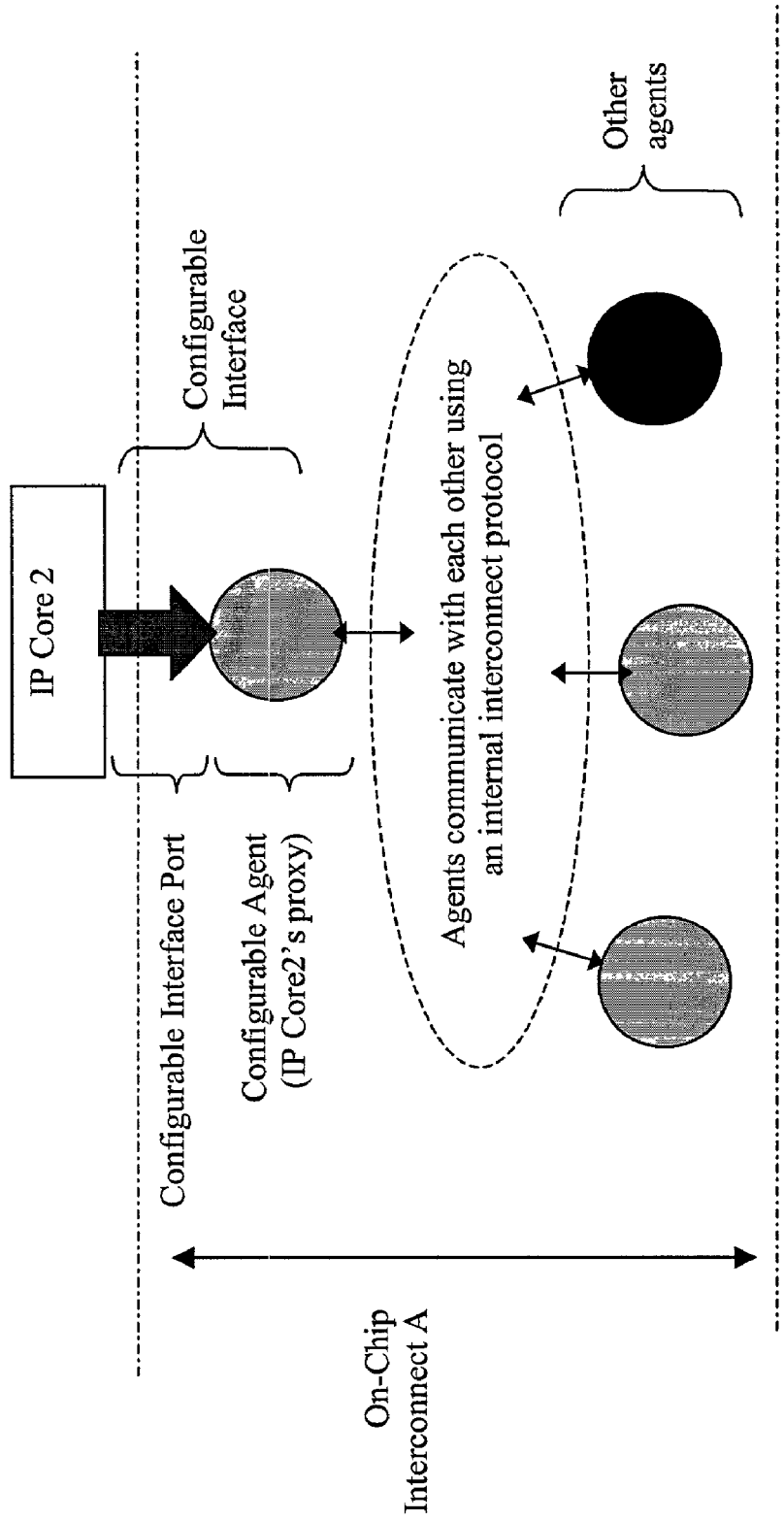
FIG. 4 illustrates one embodiment of the present invention showing an IP core, its interface port, its agent and other agents on the same interconnect.

An on-chip interconnect A with configurable interfaces (on its edge) is shown at the upper-left corner in FIG. 3. A configurable interface contains a configurable agent and a configurable interface port as further expanded in FIG. 4. The configurable interface port (for example, an interface defined by the Open Core Protocol (OCP)) may be used to communicate with an IP core (such as the IP Core 2 shown in FIG. 4) outside the interconnect. In other words, the IP core must understand the protocol used by the interface port. A configurable agent acts as the interconnect proxy for its IP core, and understands both the protocol used by the interface port and the interconnect protocol used among agents.

An interface port usually has two types of channels, one for sending/receiving data-path request/responses and the other for delivering control-path signals. The interface port may be configured to have only the features required by its IP core. For example, an interface port should have a data width that equals the IP core's word size.

An agent also needs configuration flexibility in order to work with its attached configurable interface port, as well as having a converter to translate protocol signals from its IP core to the interconnect protocol understood by all agents.

In a one-interconnect environment, the configurable agents and interface ports may only need to communicate with the core, and to other agents. In a multiple-interconnect environment, interconnects can be connected using configurable agents and interface ports. A major benefit of using existing agents and interface ports to bridge on-chip interconnects is the re-use of existing validation tools and the environment. In addition, these different interconnects are allowed to have, for instance, different protocols, data widths, and clock frequencies. As shown in the middle of FIG. 3, the two black configurable agents, A1 and B1 (A1 resides in the Interconnect A, and B1 in the Interconnect B) are linked together with an interface port, and act as bridge agents between the two on-chip interconnects. This architecture may demand improved capabilities to bridge agents and bridge interface ports, so that important on-chip, inter-network characteristics such as topology, flooding control, clocking/reset, and performance enhancement, may be provided.

The characteristics of topology and flooding control between agents need to be addressed for on-chip internetworking. For example, circular forwarding paths may show up in some topologies and can lead to flooding, therefore, must be prevented. It is also safe to only focus on a few topologies, such as fully connected ones and trees. (This is primarily an implementation limitation. Due to the limited physical size, the number of on-chip interconnects co-existing inside an on-chip network should be limited. Therefore, considering only fully-connected and tree-type topologies should cover the majority of the possible cases. It may also be desirable to require that there be at most one routing path between any two agents in the on-chip network.) To prevent flooding, a forwarding configuration parameter, bridge_forward (to be explained later), is used by a bridge agent to control whether to forward requests originating from another "bridge" agent on the same interconnect to a neighboring interconnect.

Figure 5:
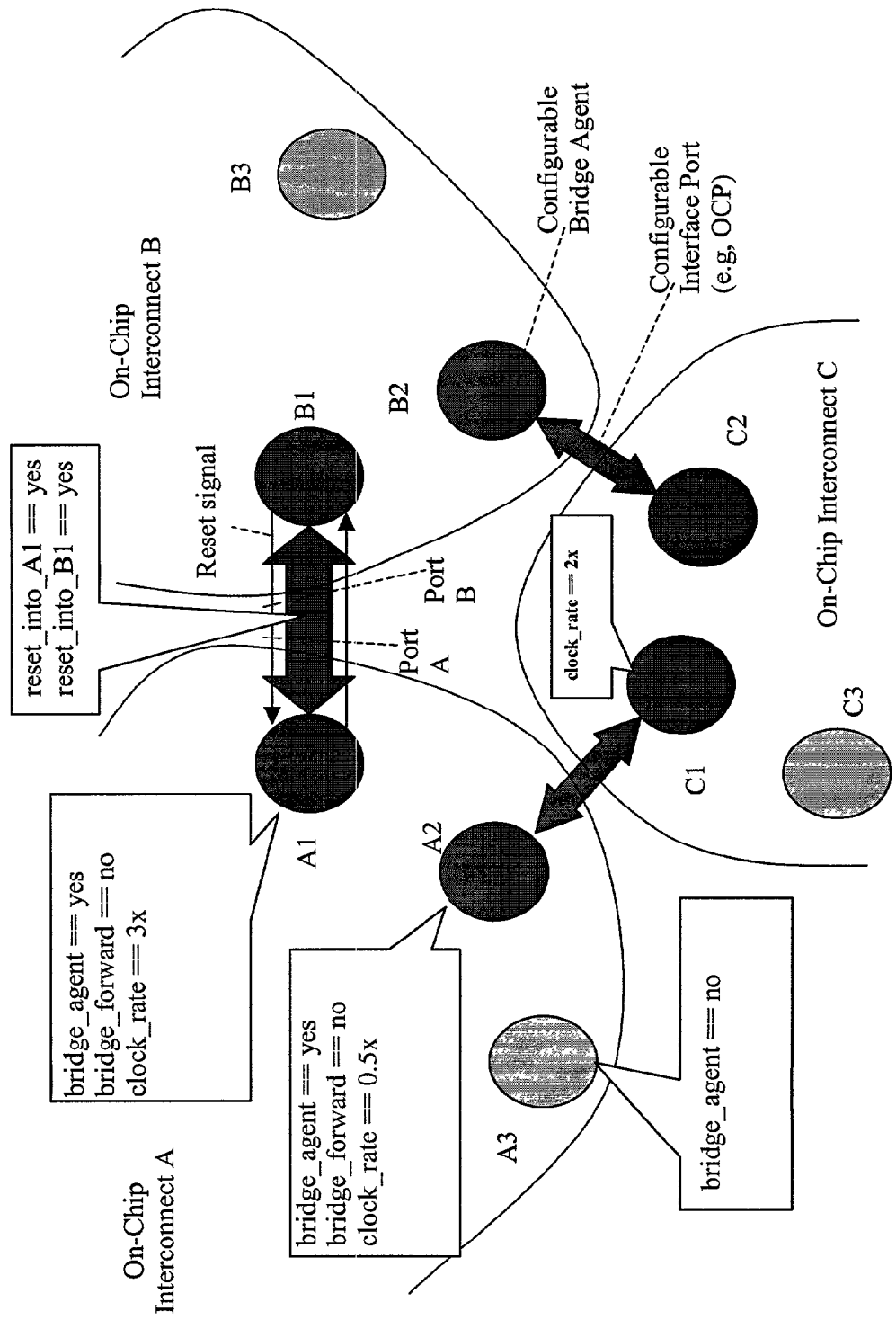
FIG. 5 illustrates one embodiment of the present invention showing inter-network configurations regarding an agent's role, clock and reset information, network topology information, and the actual network topology.

An enlarged block diagram for the center part of FIG. 3 is shown in FIG. 5, where a fully connected topology among Interconnect A, B, and C is shown. In addition, a bridge agent is connected to an external bridge agent residing on a neighboring interconnect using a configurable interface port (Table 2 in FIG. 16 includes a short description for each of the configuration parameters discussed in this section). For this example, 1. Agents inside an interconnect are classified as two types using the configuration parameter, bridge_agent. "Yes" identifies a bridge agent, and "no" a non-bridge agent.
2. The configuration parameter, bridge_forward, is set to "no" for each of the six bridge agents (A1, A2, B1, B2, C1, and C2), to signify the fact that a fully connected topology is used.
3. Requests sent by agents inside an interconnect are tagged with the agent type.
4. A bridge agent uses its bridge_forward information, plus, a request's agent-type tag to decide whether to forward the request to its neighboring interconnect. When an agent's bridge_forward parameter equals "yes", the agent always forwards requests. Otherwise, the agent only forwards requests with a tag of a non-bridge agent.
5. A bridge agent never loops back requests received from its connected external bridge agent residing on a neighboring interconnect.

In this fully connected example, bridge agent A1 will never forward its received requests that are sent by bridge agent A2 or B1, to B1. However, requests from agent A3 can be forwarded to B1, if necessary. For a tree-type topology, the bridge_forward configuration parameter needs to be set to "yes" so that a bridge agent always forwards requests, except loop back, to its neighboring interconnect.

Figure 6:
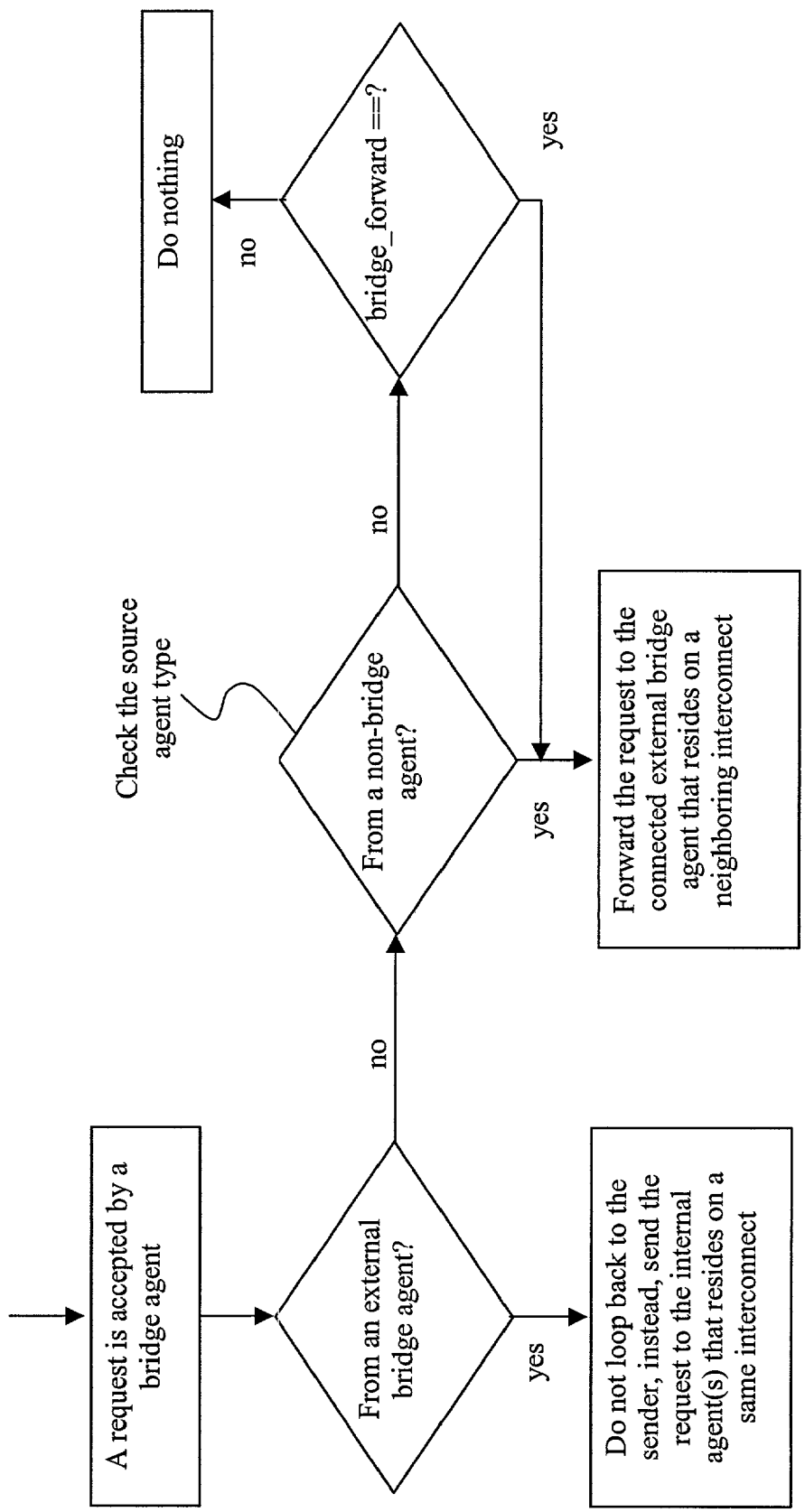
FIG. 6 illustrates one embodiment of the present invention showing a bridge agent's forwarding algorithm.

A flowchart of the forwarding algorithm used by a bridge agent for one embodiment of the present invention is described in FIG. 6.

Figure 7:
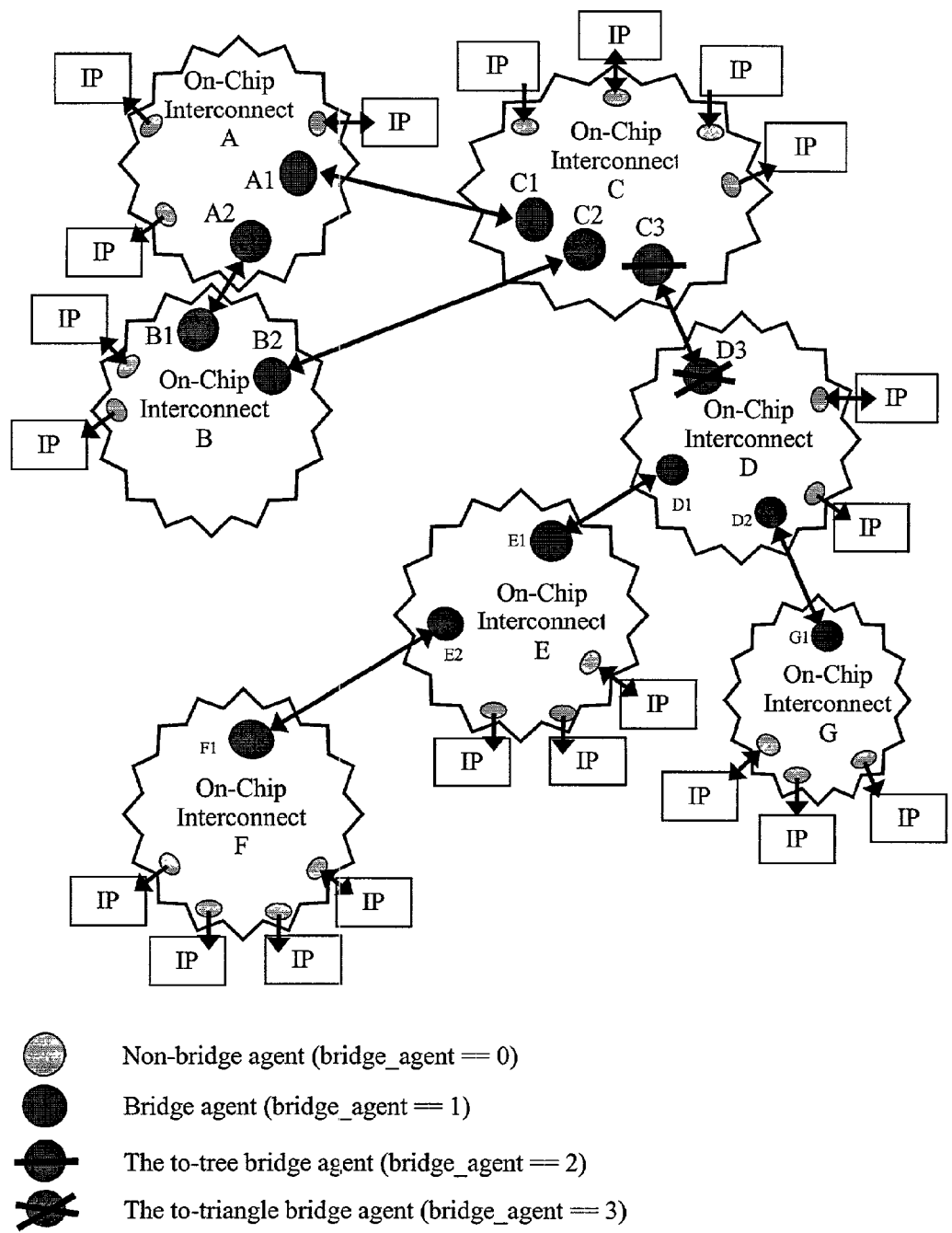
FIG. 7 illustrates one embodiment of the present invention showing a topology, which includes a fully connected triangle sub-topology and a tree sub-topology, where four types of agents are shown.
Figure 8:
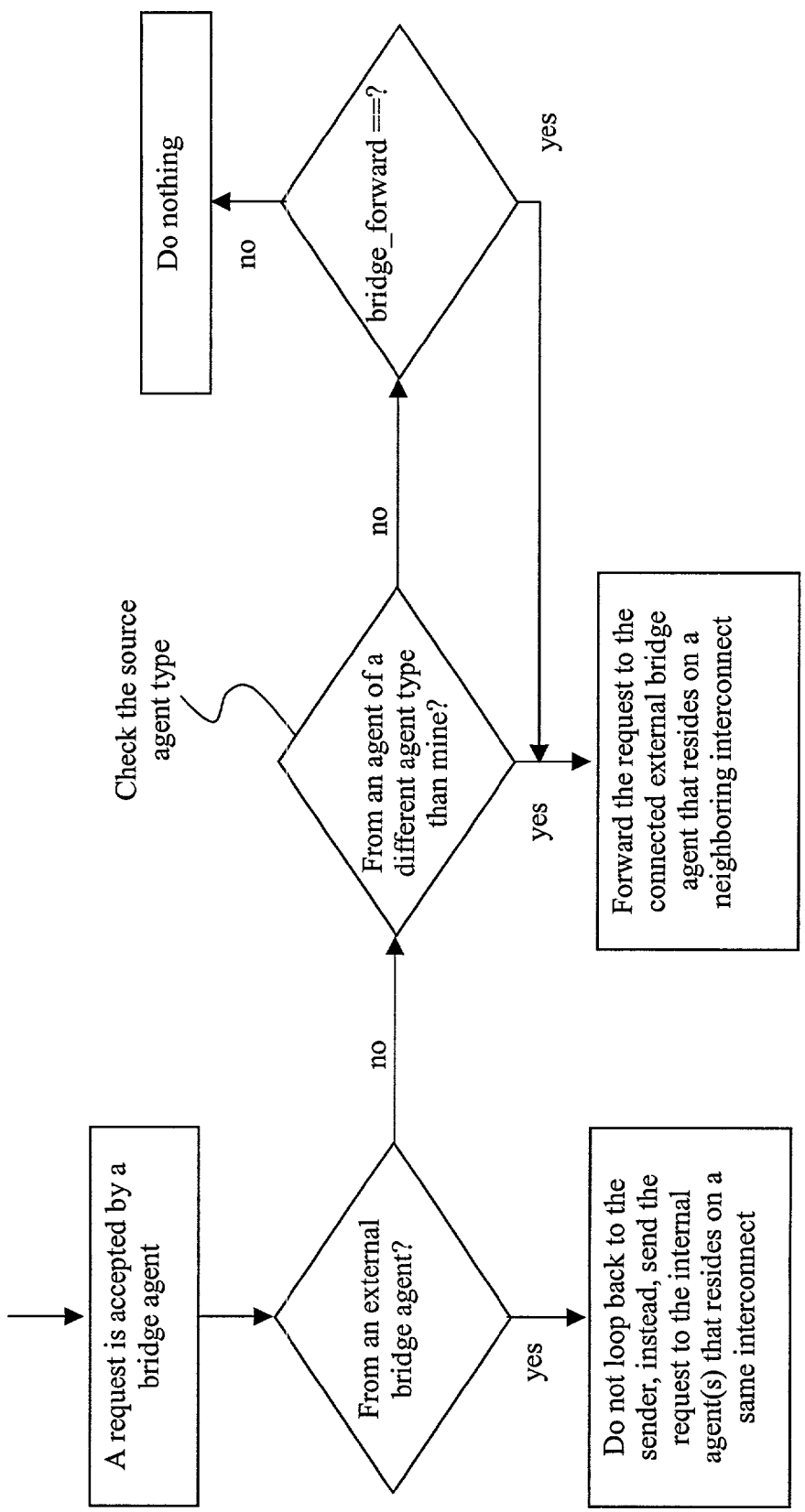
FIG. 8 illustrates one embodiment of the present invention showing a bridge agent's forwarding algorithm for a topology, which includes a fully connected triangle sub-topology and a tree sub-topology.

As for other topologies, the algorithm in FIG. 6 and the definition of the configuration parameter bridge_agent stored in each agent (as shown in FIG. 5) must be modified in order to make it work again. For instance, FIG. 7 shows an on-chip network that includes a tree (of Interconnects D, E, F, and G) and a fully connected triangle (of Interconnects A, B, and C). The two sub topologies are linked together through a single bridge interface that is connected to a to-tree bridge agent, C3, on the triangle sub-topology side and a to-triangle bridge agent, D3, on the tree sub-topology side. The following modifications to the algorithm are needed:

1. Agents inside an interconnect are classified as four types using the configuration parameter, bridge_agent. "0" identifies a non-bridge agent, "1", "2", or "3" identifies a bridge agent where "2" represents the to-tree bridge agent C3, "3" represents the to-triangle bridge agent D3, and "1" for the rest of the bridge agents (A1, A2, B1, B2, C1, C2, D1, D2, E1, E2, F1, and G1).
2. The decision-making box labeled with "Check the source agent type", at the center of FIG. 6, must be modified to: "From an agent of a different agent type than mine" as shown at the center of FIG. 8.

As previously mentioned, an interface port usually has two types of channels, data-path and control-path. The forwarding methodology just described for bridge agents may also be applied to control-path signals, with specialization though, to preclude circular paths. However, for practical reasons such as to limit the total number of control-path wires between interconnects, the system may want to limit the sideband signals' flooding control to tree-type topologies.

Figure 9:
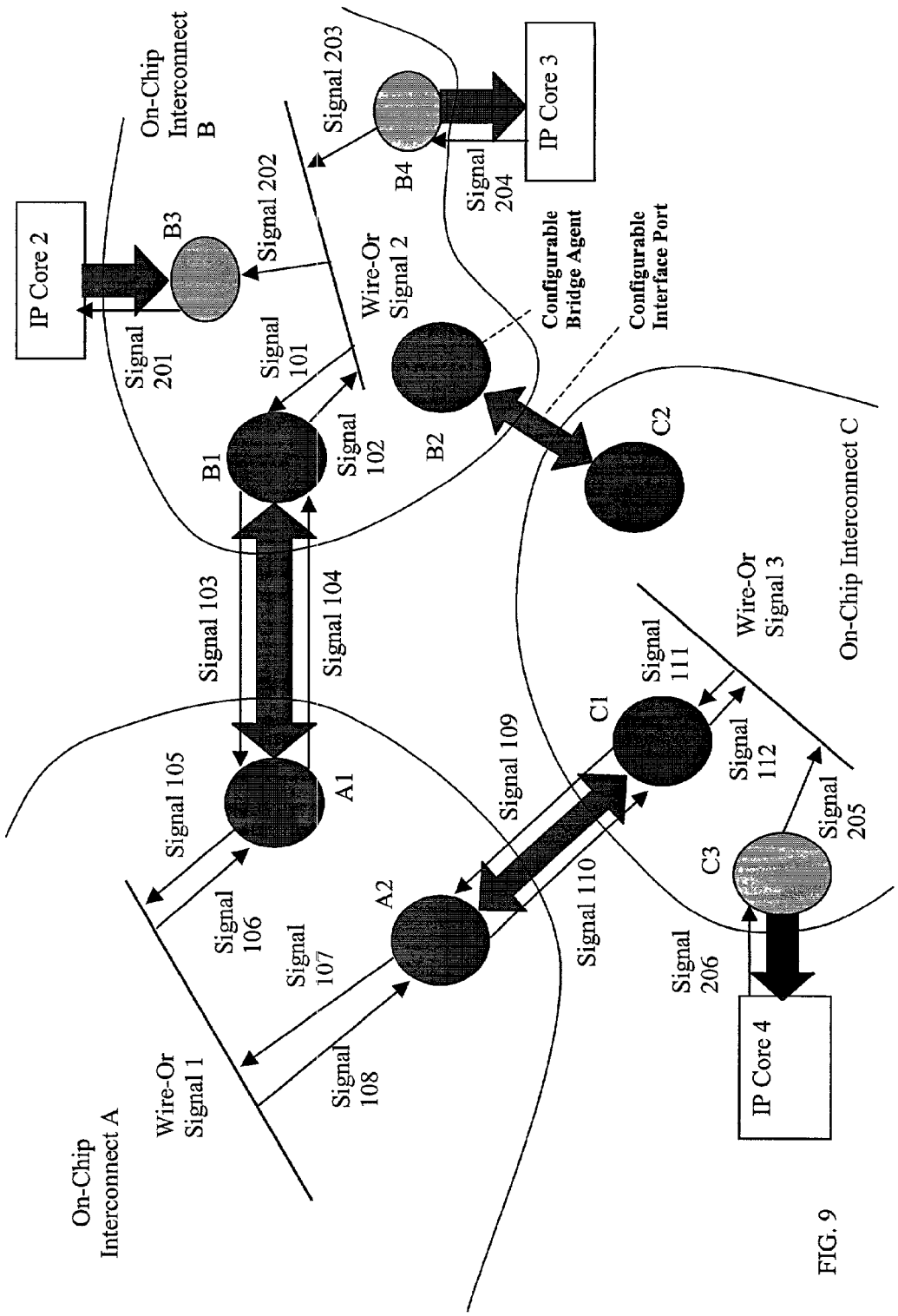
FIG. 9 illustrates one embodiment of the present invention showing inter-network configurations regarding an agent's role, an IP core's role, a control-path topology for a fully-connected on-chip network, and the forwarding of control-path signals.

In FIG. 9, a fully connected topology among Interconnect A, B, and C is used for data-path delivery. Nevertheless, for control-path signals only inter-interconnect connectivity between Interconnect A and B (Signal 103 and Signal 104), and between Interconnect A and C (Signal 109 and Signal 110) are used. Shared Wire-Or Signal 1, 2, and 3 are used for delivering intra-interconnect control-path signals for Interconnect A, B, and C, respectively. Inside an interconnect, a non-bridge agent drives and receives intra-interconnect control-path signals, all the time if connected, to and from the shared wire-or signal residing in the agent's interconnect. For example, in FIG. 9, IP Core 3 can deliver a control-path signal to IP Core 2 starting from Signal 204, to agent B4, to Signal 203, to Wire-Or Signal 2, to Signal 202, to agent B3, and then to Signal 201.

Special logic is needed for bridge agents to decide whether to forward control-path signals across interconnects and to prevent loop back. FIG. 10A and 10B illustrates one embodiment of the present invention showing in Table 1A, 1B, 1C, and 1D, how bridge agents C1, A2, A1, and B1 forward the control-path signals. For example, an inter-interconnect control-path signal sent from IP Core 4 to IP Core 2 is delivered as follows:

1. In Interconnect C, the control-path signal starts from IP Core 4, to Signal 206, to the non-bridge agent C3, to Signal 205, to the shared Wire-Or Signal 3, to Signal 111, then to the bridge agent C1. Bridge agent C1 uses the logic described in Table 1A of FIG. 10A to decide whether to forward signal on Signal 111 to the agent's inter-interconnect control-path signal of Signal 109, as well as to prevent signal loop back.
2. For Interconnect A, bridge agent A2 receives inter-interconnect control-path signal from Signal 109 and uses the logic described in Table 1B of FIG. 10A to decide whether to deliver the signal to Interconnect A (i.e., to Signal 107). When a signal is delivered, it goes to Signal 107, to the shared Wire-Or Signal 1, to Signal 106, then, to the bridge agent A1. Again, bridge agent A1 uses the logic described in Table 1C of FIG. 10B to decide whether to forward signal on Signal 106 to the agent's inter-interconnect control-path signal of Signal 104, as well as to prevent signal loop back.
3. For Interconnect B, bridge agent B1 receives inter-interconnect control-path signal from Signal 104 and uses the logic described in Table 1D of FIG. 10B to decide whether to deliver the signal to Interconnect B (i.e., to Signal 102). When a signal is delivered, it goes to Signal 102, to the shared Wire-Or Signal 2, to Signal 202, then, to the non-bridge agent B3, to Signal 201, and finally to the IP Core 2.

Note that in Interconnect B, the shared Wire-Or Signal 2 is used to deliver control-path signals from IP Core 3 to IP Core 2 and from IP Core 4 to IP Core 2 at the same time. However, if desirable, two signals can be used instead.

Each on-chip interconnect may be operated at a different clock rate. (That is, different sub-systems in an on-chip network usually have different requirements on clock speed. For instance, the clock speed of an interconnect connecting I/O IP cores is usually much slower than an interconnect for linking CPU, DSP, and SRAM cores.) Therefore, a bridge agent must be able to determine the clock rate used by its neighboring interconnect and perform appropriate adjustments. To resolve this problem requires the following:
1. Each bridge agent needs a configuration parameter, clock_rate, that stores information about the operating clock rate of the neighboring on-chip interconnect with respect to the agent's.
2. The bridge agent must be able to adjust signals based on the value given by the clock_rate parameter.

As shown in FIG. 5, the clock_rate parameter for bridge agent A1 indicates that the neighboring Interconnect B uses a clock 3 times faster than Interconnect A. Bridge agent A2 has information that Interconnect C operates at half of its speed. Therefore, agent A1 must use a 3 times faster clock rate in sampling/driving signals from/to Interconnect B. Similarly, agent A2 must use a half of its clock rate in sampling/driving signals from/to Interconnect C. Inside Interconnect A, agents A1 and A2 talk to each other using the same clock rate. Moreover, on Interconnect C, the clock_rate parameter of agent C1 says that Interconnect A is operating at twice the speed of C1.

Each on-chip interconnect should be allowed to initiate a reset at anytime, independently, with no harm being done to the others. For instance, each on-chip interconnect usually represents a different sub-section on the chip and it may need a different start-up time before its normal operation may begin. Interconnects coming out of cold reset early must wait for others. It is also possible that some IP cores connecting to an interconnect may fail to respond and the administrating agent of the interconnect may shut down the interconnect temporarily before it can restart normal operations. It is important that such a partial reset operation (with respect to the whole on-chip network) can be confined to just the offending region. The following algorithm meets this requirement.
1. A bridge interface port needs to be configured with a reset control-path signal, or, if it is a bi-directional interface port, two reset signals, one for each direction.
2. If the incoming reset signal of a bridge agent is asserted (i.e., the neighboring interconnect, or part of the interconnect, is in reset mode), the bridge agent should ignore any incoming signals, and not forward any requests to the in-reset-mode agent; otherwise, they may get lost.

Between agents A1 and B1 in FIG. 5, the interface port is configured with both the reset_into_A1 parameter and the reset_into_B1 parameter set to "yes". If agent A1 detects an assertion on its incoming reset signal, A1 should ignore all other incoming signals from B1. Also, A1 should wait till the de-assertion of its incoming reset signal before driving new signals to B1.

Inside an on-chip interconnect, agents act as proxies for IP cores to exchange information among each other. For bridge agents that role may be extended to cover properties of other interconnects. That is, some bridge agents may become internetworking proxies, if they carry information about other interconnects.

Figure 11:
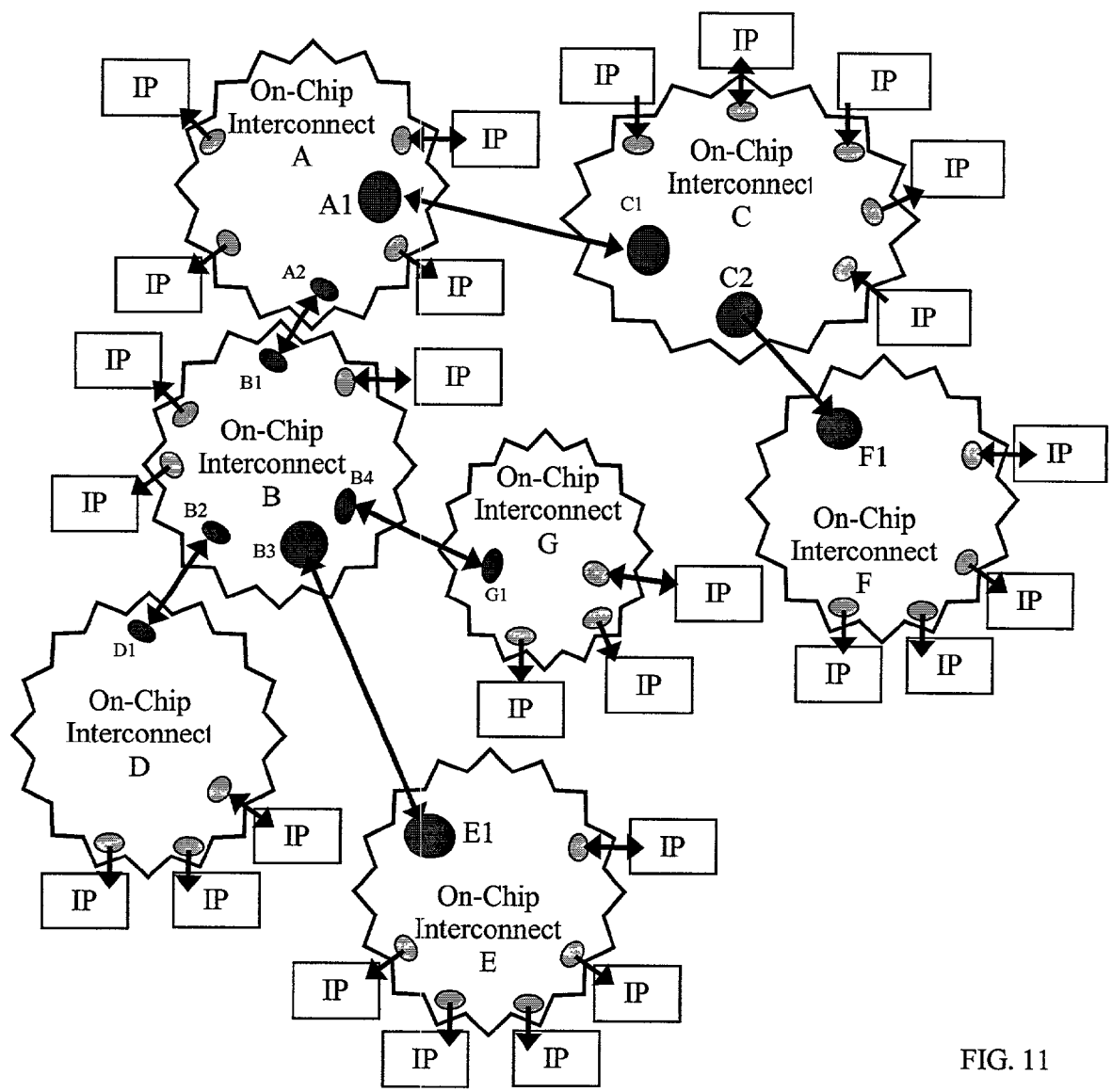
FIG. 11 illustrates one embodiment of the present invention showing a tree-type topology where some bridge agents are acting as internetworking proxies.

FIG. 11 shows seven on-chip interconnects, labeled as A, B, C, D, E, F, and G, that are connected to a tree-type topology to form a single on-chip network (where bridge agents are shown in solid black ovals, labeled as A1, A2, B1, B2, B3, B4, C1, C2, D1, E1, F1, and G1). The bridge agent A1 also acts as an internetworking proxy inside the on-chip interconnect A and carries an address map that covers address spaces for both the on-chip interconnects C and F. When A1 sees an internal request on interconnect A with an address designated to interconnect C, or F, it forwards the request externally. Bridge agent E1 also has an address map that covers the address spaces of interconnects A, B, C, D, F, and G. Bridge agent F1 does not forward any internal requests to other interconnects (only a one-directional path exists between bridge agent C2 and F1). That is, F1 does not need to have an address map that covers the other interconnects, therefore, it is only a bridge agent but not an internetworking proxy. As for other bridge agents, they are all acted as internetworking proxies, and their external address maps are of the following:
1. C2 has an address map that covers the address space of interconnect F.
2. C1 has an address map that covers the address spaces of interconnects A, B, D, E, and G.
3. A2 has an address map that covers address the spaces of interconnects B, D, E, and G.
4. B1 has an address map that covers the address spaces of interconnects A, C, and F.
5. B2 has an address map that covers the address space of interconnect D.
6. B3 has an address map that covers the address space of interconnect E.
7. B4 has an address map that covers the address space of interconnect G.
8. D1 has an address map that covers the address spaces of interconnects A, B, C, E, F, and G.
9. G1 has an address map that covers the address spaces of interconnects A, B, C, D, E, and F.

Other information that may be covered using the same method for covering address spaces by an internetworking proxy agent includes, but is not limited to, multicast group IDs (identifications). A multicast group ID may be used to represent a set of IP cores such that, when a multicast request is issued with a multicast group ID, the request should be delivered to each of the IP cores represented by the multicast group ID.

When a fully-connected topology (as shown in FIG. 5) is used for an on-chip network, all bridge agents are internetworking proxy agents. An internetworking proxy only needs to cover information for its directly connecting on-chip interconnect. For example, both bridge agents A2 and B2 contain an address map and a multicast-group-ID map that covers only on-chip interconnect C.

The latency and bandwidth requirements for on-chip networks may be much more stringent compared to other environments, for example, a wide area network such as the Internet. Several cycles of delay in a bridge agent may lead to noticeable internetworking performance loss (between two connected on-chip interconnects). To reduce bridge bottlenecks, it may be important to provide a mechanism to allow connected bridge agents to exchange both static and dynamic information related to performance.

In one embodiment of the present invention, one mechanism for enhancing performance is to provide information within the first few parts of a multi-phase transaction, to allow the agent to predict the behavior of the rest of the phases. A bridge agent may apply the following general algorithm.

1. In receiving the first few transfers (can be only the first one) of a multi-transfer transaction, a bridge agent extracts the needed context information.
2. The bridge agent may then utilize the information to pre-allocate resources, and/or to adjust its proxy strategy to improve network utilization.
3. It is also possible that global performance enhancement information relating to the data-path may be delivered, to a bridge agent, through the control path signals of the agent's interface port.

Figure 12:
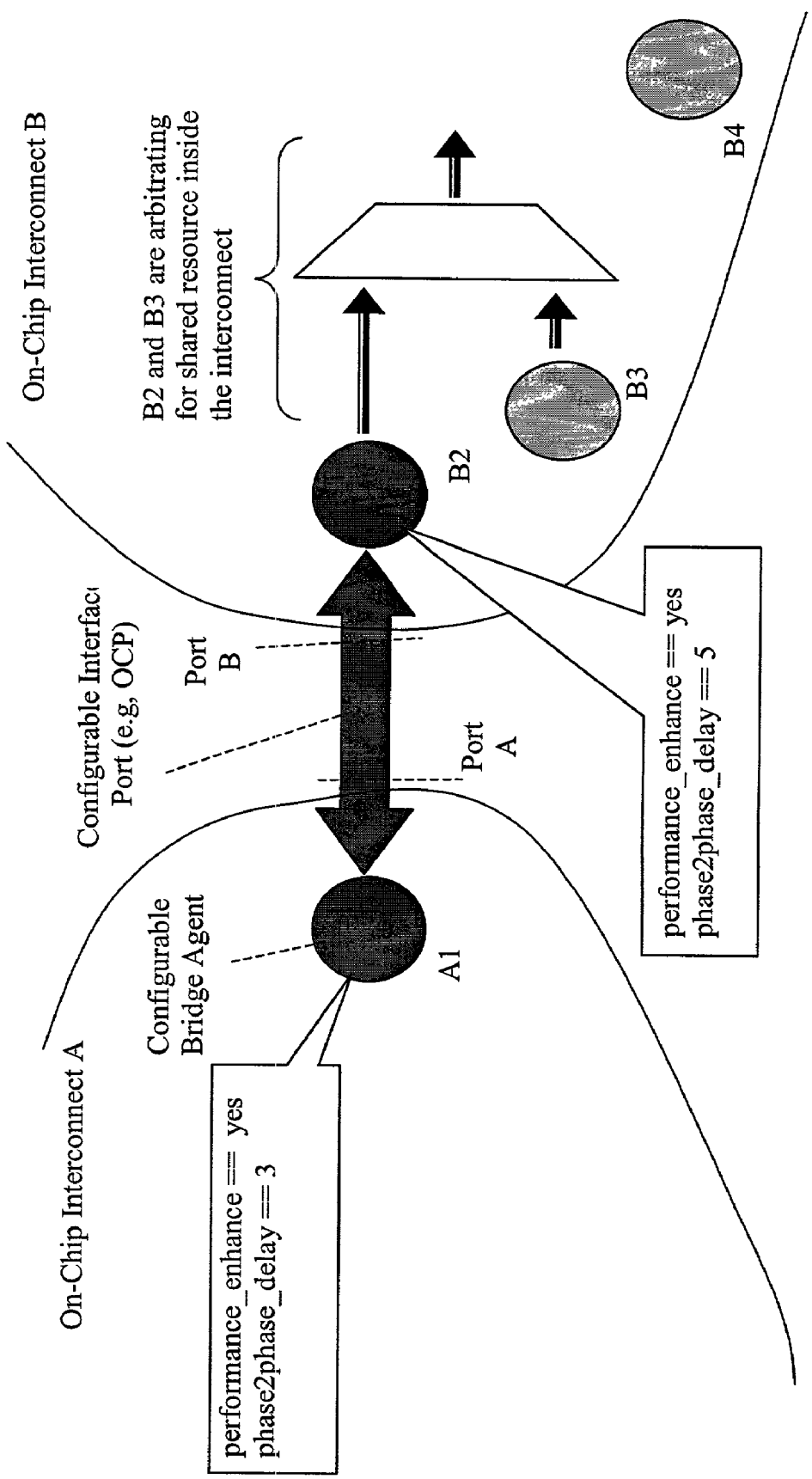
FIG. 12 illustrates one embodiment of the present invention showing inter-network configurations regarding performance enhancement.
Figure 13:
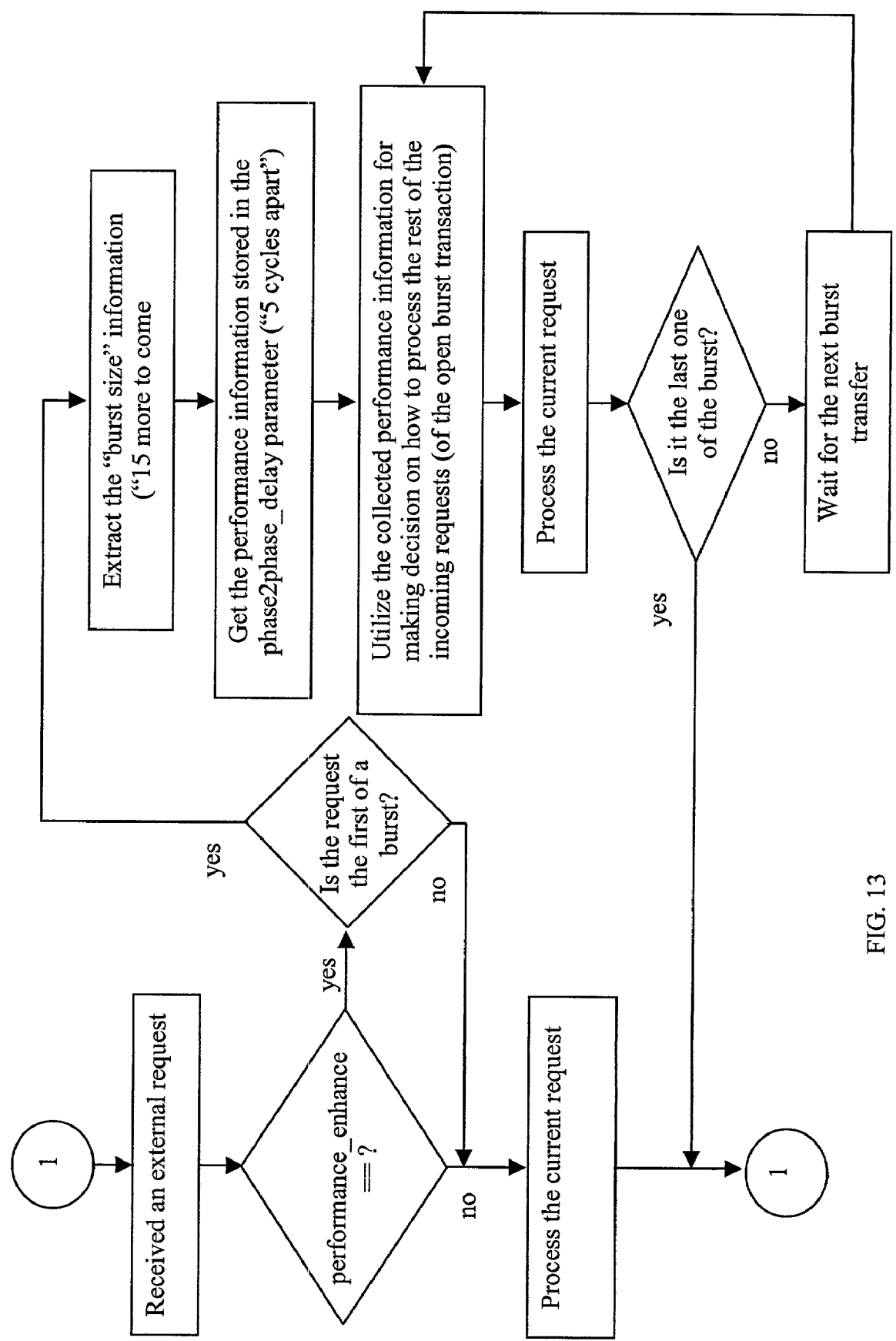
FIG. 13 illustrates one embodiment of the present invention showing a flowchart how a bridge agent may utilize performance information to handle a 16-transfer burst transaction.

For example, in FIG. 12, assume that the bridge agent A1 is going to send a 16-transfer burst transaction to the bridge agent B2. The number 16 is transmitted in the context information of the first transfer to indicate that 15 more are coming. If B2's performance enhancement mechanism is enabled (the configuration parameter, performance_enhance, is set to "yes"), B2 also knows in advance that for any multi-phase transaction coming from A1, any two consecutive phases (in this case, two consecutive transfers of a burst) will arrive exactly 5 cycles apart (the performance parameter, phase2phase_delay, is 5). Therefore, upon receiving the first transfer of the burst transaction, agent B1 knows that exactly 15 more transfers will be received with an inter-arrival time of 5 cycles. The dynamic information, "15 more to come", and the static information, "5 cycles apart", may now be used to help the bridge agent B2 to decide, how to arbitrate for shared resources (or to conserve resources, etc.) while interconnecting with other agents inside on-chip interconnect B. FIG. 13 shows a flowchart describing how B2 may utilize performance information to handle a 16-transfer burst transaction in one embodiment of the present invention.

Inter-arrival behavior as described above may be hard to obtain. However, for on-chip networks, an easier parameter to get may be the maximum inter-arrival time. This may also be useful. An example of using this parameter is described below.

There are other performance parameters that may be defined and used by not only bridge agents, but also non-bridge agents. For example:

1. A min_req2resp_delay performance parameter may be used to indicate that when a bridge agent (or an IP core) sends a request to its interface port, the response of the request will not be back until "min_req2resp_delay" cycles later. If the parameter's value is greater than 0, it indicates that the bridge agent (or the IP core) may not need an aggressively optimized logic in preparing for the response to return, with respect to cycle timing.
2. A max_outstanding_reqs performance parameter may be used by a bridge agent (or IP core) to not overflow its direct connected partner (an agent or IP core). The parameter tells the maximum number of outstanding requests that may be processed simultaneously by the partner.

A short description for each of the configuration parameters discussed in this section is included in Table 2 of FIG. 16.

Many existing on-chip interconnects can be categorized as multi-drop buses with either a single pipeline or a split-transaction pipeline. For these types of interconnects, if the command and data of a write request arrive at different cycles, performance optimization for writes may be necessary.

Figure 14:
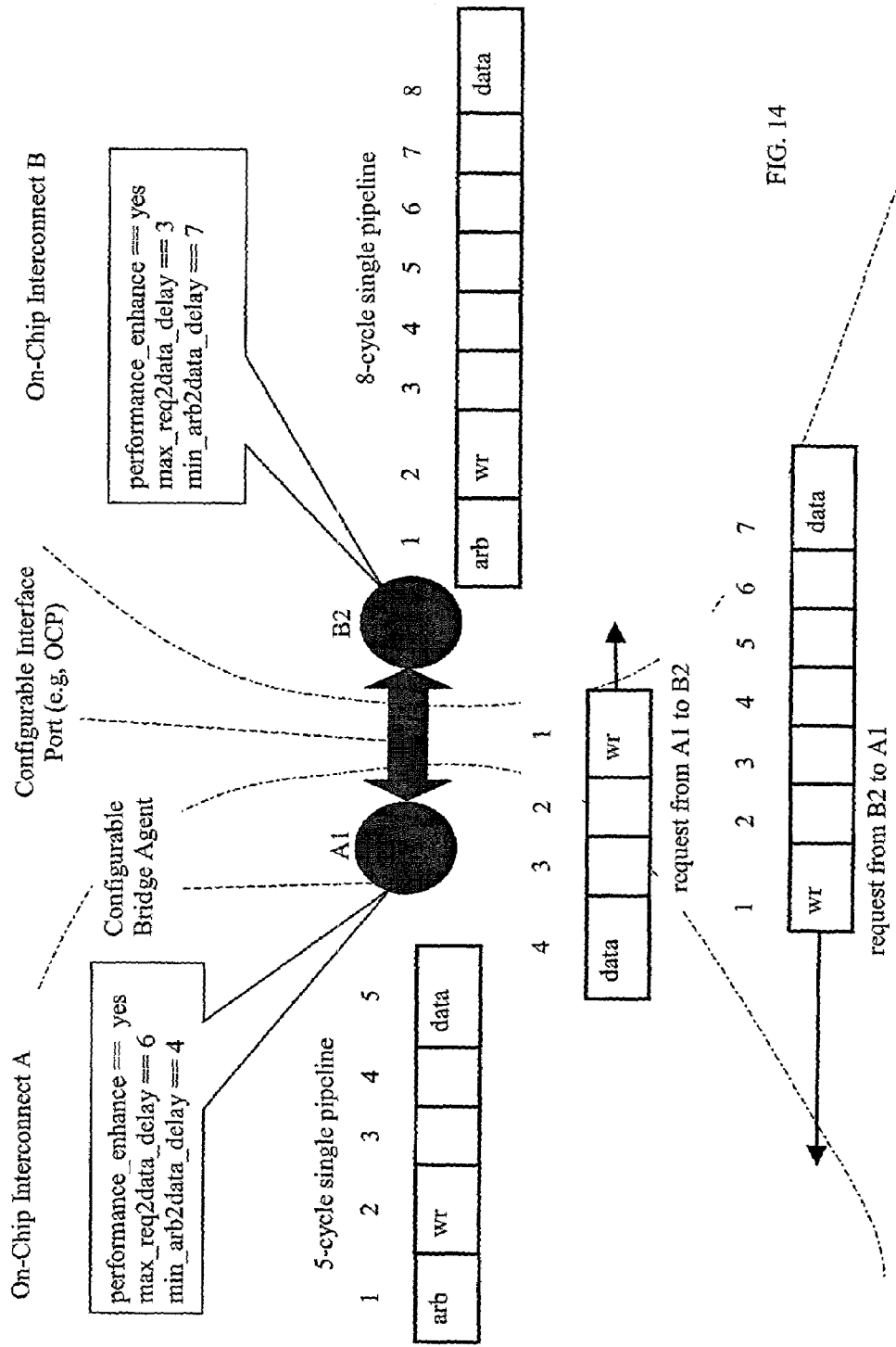
FIG. 14 illustrates one embodiment of the present invention showing performance optimization between two single-pipeline interconnects.

In one embodiment of the present invention, FIG. 14 shows two single-pipeline interconnects linked through bridge agents A1 and B2. A single 5-cycle write pipeline and a single 8-cycle write pipeline are used for the on-chip interconnects A and B, respectively. On interconnect A, the command of a write request comes in at the second cycle, and the write data comes in at the fifth cycle. On interconnect B, the command and write data of a write request come in at the second and the eighth cycles, respectively. Also, agent A1 immediately forwards what it receives internally, to B2; the same behavior also goes from B2 to A1. Upon receiving an external request a bridge agent has to arbitrate on its internal bus (at cycle 1), and then forward the request to one or more internal agents via the pipeline.

If no prior information is used, for instance, when B2 receives a write request from A1, B2 must wait until all pieces, of the request are received, before it can arbitrate for its internal bus. If B2 knew that "a write request's data cycle will arrive within 3 cycles of the request's command cycle", B2 can reduce its bridging latency by immediately arbitrating for its internal bus once an external write's command cycle is detected—the write data will arrive in time to catch the eighth cycle of the current open pipeline. To reduce the latency of the bridging write-pipeline, all bridge agents should use the following algorithm.

1. At a bridge agent, the configuration parameter, max_req2data_delay, stores performance guarantee information that promises that following the command cycle of an incoming write request, the write data will arrive no later than the number of cycles indicated (both the write request and write data are sent by the connected external bridge agent of the bridge agent).
2. At a bridge agent, let the configuration parameter min_arb2data_delay represent the minimum number of cycles between the arbitration cycle and the write data cycle of the bridge agent's internal pipeline.
3. Use a waiting counter to count down the number of cycles remaining for an incoming write request to be eligible for arbitration. The counter is set to the value of max{0, max_req2data_delay-min_arb2data_delay}, when a write request's command is received. The counter is set to zero when the write data is received.

Figure 15:
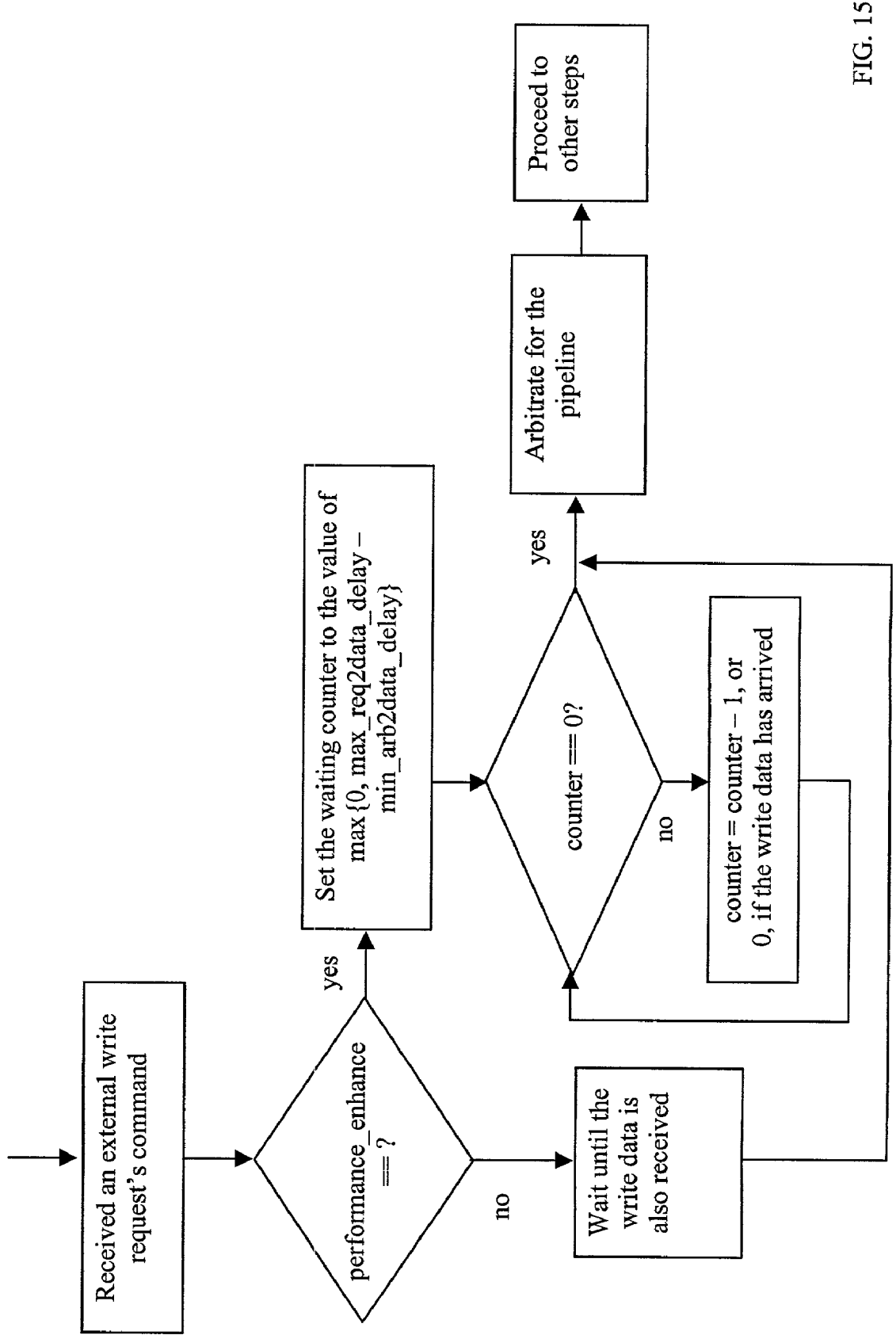
FIG. 15 illustrates one embodiment of the present invention showing a flowchart how a bridge agent can arbitrate the pipeline early.

4. If the value in the write request's waiting counter equals to 0, the bridge agent can arbitrate for its internal pipeline to send out a write request's command (see the flowchart in FIG. 15).

Thus, what has been disclosed is a method and apparatus for composing on-chip interconnects with configurable interfaces.

Referring back to FIG. 1, FIG. 1 illustrates a network environment 100 in which the techniques described may be applied. The network environment 100 has a network 102 that connects S servers 104-1 through 104-S, and C clients 108-1 through 108-C. As shown, several systems in the form of S servers 104-1 through 104-S and C clients 108-1 through 108-C are connected to each other via a network 102, which may be, for example, an on-chip communication network. Note that alternatively the network 102 might be or include one or more of: inter-chip communications, an optical network, the Internet, a Local Area Network (LAN), Wide Area Network (WAN), satellite link, fiber network, cable network, or a combination of these and/or others. The servers may represent, for example: a master device on a chip; a memory; an intellectual property core, such as a microprocessor, communications interface, etc.; a disk storage system; and/or computing resources. Likewise, the clients may have computing, storage, and viewing capabilities. The method and apparatus described herein may be applied to essentially any type of communicating means or device whether local or remote, such as a LAN, a WAN, a system bus, on-chip bus, etc. It is to be further appreciated that the use of the term client and server is for clarity in specifying who initiates a communication (the client) and who responds (the server). No hierarchy is implied unless explicitly stated. Both functions may be in a single communicating device, in which case the client-server and server-client relationship may be viewed as peer-to-peer. Thus, if two devices such as 108-1 and 104-S can both initiate and respond to communications, their communication may be viewed as peer-to-peer. Likewise, communications between 104-1 and 104-S, and 108-1 and 108-C may be viewed as peer to peer if each such communicating device is capable of initiation and response to communication.

Referring back to FIG. 2, FIG. 2 illustrates a system 200 in block diagram form, which may be representative of any of the clients and/or servers shown in FIG. 1. The block diagram is a high level conceptual representation and may be implemented in a variety of ways and by various architectures. Bus system 202 interconnects a Central Processing Unit (CPU) 204, Read Only Memory (ROM) 206, Random Access Memory (RAM) 208, storage 210, display 220, audio, 222, keyboard 224, pointer 226, miscellaneous input/output (I/O) devices 228, and communications 230. The bus system 202 may be for example, one or more of such buses as an on-chip bus, a system bus, Peripheral Component Interconnect (PCI), Advanced Graphics Port (AGP), Small Computer System Interface (SCSI), Institute of Electrical and Electronics Engineers (IEEE) standard number 1394 (FireWire), Universal Serial Bus (USB), etc. The CPU 204 may be a single, multiple, or even a distributed computing resource. Storage 210, may be Compact Disc (CD), Digital Versatile Disk (DVD), hard disks (HD), optical disks, tape, flash, memory sticks, video recorders, etc. Display 220 might be, for example, a Cathode Ray Tube (CRT), Liquid Crystal Display (ILCD), a projection system, Television (TV), etc. Note that depending upon the actual implementation of the system, the system may include some, all, more, or a rearrangement of components in the block diagram. For example, an on-chip communications system on an integrated circuit may lack a display 220, keyboard 224, and a pointer 226. Another example may be a thin client might consist of a wireless hand held device that lacks, for example, a traditional keyboard. Thus, many variations on the system of FIG. 2 are possible.

For purposes of discussing and understanding the invention, it is to be understood that various terms are used by those knowledgeable in the art to describe techniques and approaches. Furthermore, in the description, for purposes of explanation, numerous specific details are set forth in order to provide a thorough understanding of the present invention. It will be evident, however, to one of ordinary skill in the art that the present invention may be practiced without these specific details. In some instances, well-known structures and devices are shown in block diagram form, rather than in detail, in order to avoid obscuring the present invention. These embodiments are described in sufficient detail to enable those of ordinary skill in the art to practice the invention, and it is to be understood that other embodiments may be utilized and that logical, mechanical, electrical, and other changes may be made without departing from the scope of the present invention.

Some portions of the description may be presented in terms of algorithms and symbolic representations of operations on, for example, data bits within a computer memory. These algorithmic descriptions and representations are the means used by those of ordinary skill in the data processing arts to most effectively convey the substance of their work to others of ordinary skill in the art. An algorithm is here, and generally, conceived to be a self-consistent sequence of acts leading to a desired result. The acts are those requiring physical manipulations of physical quantities. Usually, though not necessarily, these quantities take the form of electrical, magnetic, or optical signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the discussion, it is appreciated that throughout the description, discussions utilizing terms such as "processing" or "computing" or "calculating" or "determining" or "communicating" or "displaying" or the like, can refer to the action and processes of a computer system, or an electronic device, that manipulates and transforms data represented as physical (electronic) quantities within the electronic device or computer system's registers and memories into other data similarly represented as physical quantities within the electronic device and/or computer system memories or registers or other such information storage, transmission, or display devices.

The present invention can be implemented by an apparatus for performing the operations herein. This apparatus may be specially constructed for the required purposes, or it may comprise a general-purpose computer, selectively activated or reconfigured by a computer program stored in the computer. Such a computer program may be stored in a computer readable storage medium, such as, but not limited to, any type of disk including floppy disks, hard disks, optical disks, compact disk- read only memories (CD-ROMs), digital versatile disk (DVD), and magnetic-optical disks, read-only memories (ROMs), random access memories (RAMs), electrically programmable read-only memories (EPROM)s, electrically erasable programmable read-only memories (LEPROMs), FLASH memories, magnetic or optical cards, etc., or any type of media suitable for storing electronic instructions either local to the computer or remote to the computer.

In an embodiment, a processing system having a processor, which when executing a set of instructions performs the following method. A request may be received. A determination is made, whether the request is from an external bridge agent that resides on a neighboring interconnect. If the request is determined to be coming from an external bridge agent that resides on a neighboring interconnect, then not looping back to the sender, and sending the request to an internal agent that resides on a same interconnect. Alternatively, if the request is determined to not be coming from an external bridge agent that resides on a neighboring interconnect, then determining if the request is from a non-bridge agent that resides on a same interconnect.

If the request is determined to be coming from a non-bridge agent that resides on a same interconnect, then forwarding the request to a connected external bridge agent that resides on a neighboring interconnect. Alternatively, if the request is determined to not be coming from a non-bridge agent that resides on a same interconnect, then determining whether a bridge forward parameter is set to no.

If the bridge forward parameter is set to no, then doing nothing. If the bridge forward parameter is not set to no, then forwarding the request to a connected external bridge agent that resides on a neighboring interconnect.

In an embodiment, a processing system having a processor, which when executing a set of instructions performs another following method. A link may be created between agent A and agent B. Agent A may query as to agent B's communication capabilities. Agent B may query as to agent A's communication capabilities. Agents A and B may then be configured to communicate.

In an embodiment, a processing system having a processor, which when executing a set of instructions performs yet another following method. A first link is created between a first interconnect and a bridge agent. A second link is created between a second interconnect and the bridge agent. The bridge agent is configured to communicate between the first link and the second link.

The algorithms and displays presented herein are not inherently related to any particular computer or other apparatus. Various general purpose systems may be used with programs in accordance with the teachings herein, or it may prove convenient to construct more specialized apparatus to perform the required method. For example, any of the methods according to the present invention can be implemented in hard-wired circuitry, by programming a general-purpose processor, or by any combination of hardware and software. One of ordinary skill in the art will immediately appreciate that the invention can be practiced with computer system configurations other than those described, including hand-held devices, multiprocessor systems, microprocessor-based or programmable consumer electronics, digital signal processing (DSP) devices, set top boxes, network PCs, minicomputers, mainframe computers, and the like. The invention can also be practiced in distributed computing environments where tasks are performed by remote processing devices that are linked through a communications network. This communications network is not limited by size, and may range from, for example, on-chip communications to WANs such as the Internet.

The methods of the invention may be implemented using computer software. If written in a programming language conforming to a recognized standard, sequences of instructions designed to implement the methods can be compiled for execution on a variety of hardware platforms and for interface to a variety of operating systems. It will be appreciated that a variety of programming languages may be used to implement the teachings of the invention as described herein. Furthermore, it is common in the art to speak of software, in one form or another (e.g., program, procedure, application, driver, . . . ), as taking an action or causing a result. Such expressions are merely a shorthand way of saying that execution of the software by a computer causes the processor of the computer to perform an action or produce a result.

In an embodiment, a machine-readable medium having stored thereon instructions, which when executed may perform the following method.

A request may be received. A determination is made, whether the request is from an external bridge agent that resides on a neighboring interconnect. If the request is determined to be coming from an external bridge agent that resides on a neighboring interconnect, then not looping back to the sender, and sending the request to an internal agent that resides on a same interconnect. Alternatively, if the request is determined to not be coming from an external bridge agent that resides on a neighboring interconnect, then determining if the request is from a non-bridge agent that resides on a same interconnect.

If the request is determined to be coming from a non-bridge agent that resides on a same interconnect, then forwarding the request to a connected external bridge agent that resides on a neighboring interconnect. Alternatively, if the request is determined to not be coming from a non-bridge agent that resides on a same interconnect, then determining whether a bridge forward parameter is set to no.

If the bridge forward parameter is set to no, then doing nothing. If the bridge forward parameter is not set to no, then forwarding the request to a connected external bridge agent that resides on a neighboring interconnect.

In an embodiment, a machine-readable medium having stored thereon instructions, which when executed may perform another following method. A link may be created between agent A and agent B. Agent A may query as to agent B's communication capabilities. Agent B may query as to agent A's communication capabilities. Agents A and B may then be configured to communicate.

In an embodiment, a machine-readable medium having stored thereon instructions, which when executed may perform another following method. A first link is created between a first interconnect and a bridge agent. A second link is created between a second interconnect and the bridge agent. The bridge agent is configured to communicate between the first link and the second link.

Similarly, in an embodiment, a machine-readable medium has stored thereon information representing an apparatus. The apparatus may include a bridge agent, a first interconnect, and a second interconnect. The bridge agent may have a first control input, a second control input, a first control output, a second control output, a first communication port, and a second communication port. The first interconnect may have a first control output, a first control input, and a communication port. The first control input couples to receive the bridge agent first control output. The first control output couples to transmit to the bridge agent first control input. The communication port couples to the bridge agent first communication port. The second interconnect may have a first control output, a first control input, and a communication port. The first control input couples to receive the bridge agent second control output. The first control output couples to transmit to the bridge agent second control input. The communication port couples to the bridge agent second communication port.

In an embodiment, a machine-readable medium has stored thereon information representing another apparatus. The apparatus may have various mechanisms. A mechanism for interconnecting one or more configurable agents. A mechanism for interfacing one or more of the configurable agents to one or more configurable interfaces. A mechanism for interfacing one or more of the configurable interfaces to one or more cores. A mechanism for configuring one or more of the configurable agents. And, mechanism for configuring one or more of the configurable interfaces.

In an embodiment, a machine-readable medium has stored thereon information representing yet another apparatus. The apparatus may have various mechanisms. A mechanism for interconnecting a bridge agent to one or more interconnects. And, a mechanism for configuring the bridge agent for communicating between the one or more interconnects.

It is to be understood that various terms and techniques are used by those knowledgeable in the art to describe communications, protocols, applications, implementations, mechanisms, etc. One such technique is the description of an implementation of a technique in terms of an algorithm or mathematical expression. That is, while the technique may be, for example, implemented as executing code on a computer, the expression of that technique may be more aptly and succinctly conveyed and communicated as a formula, algorithm, or mathematical expression. Thus, one of ordinary skill in the art would recognize a block denoting A+B=C as an additive function whose implementation in hardware and/or software would take two inputs (A and B) and produce a summation output (C). Thus, the use of formula, algorithm, or mathematical expression as descriptions is to be understood as having a physical embodiment in at least hardware and/or software (such as a computer system in which the techniques of the present invention may be practiced as well as implemented as an embodiment).

A machine-readable medium is understood to include any mechanism for storing or transmitting information in a form readable by a machine (e.g., a computer). For example, a machine-readable medium includes read only memory (ROM); random access memory (RAM); magnetic disk storage media; optical storage media; flash memory devices; etc.

Thus, a method and apparatus for composing on-chip interconnects with configurable interfaces have been described.

What is claimed is:

1. An apparatus comprising:
an agent having a first input and a first output, the first input coupled to receive a first communication from a core, wherein the agent is configured for topology and flooding control by a parameter selected from the group consisting of: bridge agent, bridge forward, and fully connected.

2. The apparatus of claim 1 wherein the agent is configured at a point in time selected from the group consisting of: at time of fabrication of the agent, at a power up, at a reset, at an initialization prior to normal operation for the agent, and dynamically during normal operation for the agent.

3. The apparatus of claim 1 further comprising a configurable interface port having a first connection port and a second connection port, the first connection port coupled to receive an interconnect communication, and the second connection port coupled to transmit the first communication.

4. An apparatus comprising:
an agent having a first input and a first output, the first input coupled to receive a first communication from a core, wherein the agent is configured for clocking and reset by a parameter selected from the group consisting of: clock rate, and reset into bridge X.

5. An apparatus comprising:
a configurable interface having a first communication port and a second communication port, the first communication port coupled to receive an interconnect communication; and
an agent having a first input and a first output, the first input coupled to the configurable interface second communication port, wherein the agent is configured for inter-network performance enhancement by a parameter selected from the group consisting of: performance enhance on/off, phase to phase delay, maximum request to data delay, minimum request to response delay, and maximum outstanding requests, wherein the first output to couple to a core.

6. The apparatus of claim 5 further comprising:
the core having an output, and
the agent having a second input and a second output, the second input coupled to receive the core output, and the second output coupled to transmit to the configurable interface second communication port.

7. The apparatus of claim 5 wherein the interface is configured at a point in time selected from the group consisting of at time of: fabrication of the interface, at a power up, at a reset, at an initialization prior to normal operation for the interface, and dynamically during normal operation for the interface.

8. An apparatus comprising:
means for interconnecting one or more configurable agents;
means for interfacing one or more of the configurable agents to one or more configurable interfaces;
means for interfacing one or more of the configurable interfaces to one or more cores;
means for configuring one or more of the configurable agents, wherein at least one configurable agent is configured for topology and flooding control by a parameter selected from the group consisting of: bridge agent, bridge forward, and fully connected; and
means for configuring one or more of the configurable interfaces.

9. The apparatus of claim 8 wherein means for configuring one or more of the configurable agents further comprises parameters selected from the group consisting of: address width, data width, command width, communication timing, receive only, transmit only, bidirectional, bridge, bridge agent, bridge proxy, internetworking proxy, reset, timer, administrator, bridge agent, bridge forward, fully connected, clock rate, reset into bridge X, performance enhance on/off, phase to phase delay, maximum request to data delay, minimum request to response delay, and maximum outstanding requests.

10. The apparatus of claim 8 wherein means for configuring one or more of the configurable agents further comprises means for configuring at a point in time selected from the group consisting of: at time of fabrication, at a power up, at a reset, at an initialization prior to normal operation, and dynamically during normal operation.

11. The apparatus of claim 8 wherein means for configuring one or more of the configurable interfaces further comprises parameters selected from the group consisting of: address width, data width, command width, communication timing, receive only, transmit only, bidirectional, bridge, bridge agent, bridge proxy, internetworking proxy, reset, timer, administrator, bridge agent, bridge forward, fully connected, clock rate, reset into bridge X, performance enhance on/off, phase to phase delay, maximum request to data delay, minimum request to response delay, and maximum outstanding requests.

12. The apparatus of claim 8 wherein means for configuring one or more of the configurable interfaces further comprises means for configuring at a point in time selected from the group consisting of: at time of fabrication, at a power up, at a reset, at an initialization prior to normal operation, and dynamically during normal operation.

13. A system comprising:
a plurality of configurable agents coupled to
a plurality of configurable interfaces; and
a processor for configuring the configurable agents and the configurable interfaces, wherein the configurable agents are configured for inter-network performance enhancement by a parameter selected from the group consisting of performance enhance on/off, phase to phase delay, maximum request to data delay, minimum request to response delay, and maximum outstanding requests.

14. The system of claim 13 wherein configuring the configurable agents and the configurable interfaces is configuring the configurable agents and the configurable interfaces to communicate.

15. The system of claim 14 wherein configuring is configuring parameters selected from the group consisting of: address width, data width, command width, communication timing, receive only, transmit only, bidirectional, bridge, bridge agent, bridge proxy, internetworking proxy, reset, timer, administrator, bridge agent, bridge forward, fully connected, clock rate, reset into bridge X, performance enhance on/off, phase to phase delay, maximum request to data delay, minimum request to response delay, and maximum outstanding requests.

16. The system of claim 15 wherein configuring further comprises configuring at a point in time selected from the group consisting of: at time of fabrication, at a power up, at a reset, at an initialization prior to normal operation, and dynamically during normal operation.

17. The system of claim 13 further comprising circuitry, which when operating, performs the following:
receives an input communications;
adjusts the input communications based upon a target's communications capabilities; and
transmits the adjusted input communications to the target.

18. The system of claim 17 wherein the circuitry to receive information selected from the group consisting of: address width, data width, command width, communication timing, receive only, transmit only, bidirectional, bridge, bridge agent, bridge proxy, internetworking proxy, reset, timer, administrator, bridge agent, bridge forward, fully connected, clock rate, reset into bridge X, performance enhance on/off, phase to phase delay, maximum request to data delay, minimum request to response delay, and maximum outstanding requests.

19. An apparatus comprising:
a first bridge agent;
a second bridge agent;
a configurable interface port coupled to the first bridge agent and the second bridge agent; and
a configurable interface port parameter RIAB (reset into a bridge) which when ON in the configurable interface port informs a receiving bridge that a reset signal exists, which when asserted informs the receiving bridge that an originating bridge is in reset mode.

20. The apparatus of claim 19 wherein the coupling of the first bridge agent to the second bridge agent allows for communication through the configurable interface port between the first bridge agent and the second bridge agent.

21. The apparatus of claim 19 wherein the interface port is configured at a point in time selected from the group consisting of: at time of fabrication of the interface port, at a power up, at a reset, at an initialization prior to normal operation for the interface port, and dynamically during normal operation for the interface port.

22. An apparatus comprising:
a bridge agent having a first control input, a second control input, a first control output, a second control output, a first communication port, and a second communication port;
a first interconnect having a first control output, a first control input, and a communication port, the first control input coupled to receive the bridge agent first control output, the first control output coupled to transmit to the bridge agent first control input, and the communication port coupled to the bridge agent first communication port; and
a second interconnect having a first control output, a first control input, and a communication port, the first control input coupled to receive the bridge agent second control output, the first control output coupled to transmit to the bridge agent second control input, and the communication port coupled to the bridge agent second communication port.

23. The apparatus of claim 22 wherein the bridge control signals configure the bridge agent to control transmission of a communication between the first interconnect communication port and the second interconnect communication port.

24. The apparatus of claim 23 wherein the configuring of the bridge agent is a mode of operation selected from the group consisting of: do not forward the communication from the first interconnect communication port to the second interconnect communication port, do not forward the communication from the second interconnect communication port to the first interconnect communication port, do not forward the communication, forward the communication from the first interconnect communication port to the second interconnect communication port, forward the communication from the second interconnect communication port to the first interconnect communication port, and forward the communication.

25. The apparatus of claim 24 wherein the bridge agent is configured at a point in time selected from the group consisting of: at time of fabrication of the bridge agent, at a power up, at a reset, at an initialization prior to normal operation for the bridge agent, and dynamically during normal operation for the bridge agent.

26. The apparatus of claim 22 wherein the second interconnect is a second bridge agent.

27. An apparatus comprising:
means for interconnecting a bridge agent to one or more interconnects; and
means for configuring the bridge agent for communicating between the one or more interconnects, wherein the bridge agent is configured for clocking and reset by a parameter selected from the group consisting of: clock rate, and reset into bridge X.

28. The apparatus of claim 27 wherein the bridge agent configuration is selected from a mode of operation selected from the group consisting of: do not forward a communication from a first interconnect to a second interconnect, do not forward a communication from a second interconnect to a first interconnect, do not forward a communication, forward a communication from a first interconnect to a second interconnect, forward a communication from a second interconnect to a first interconnect, and forward a communication.

29. The apparatus of claim 28 wherein the bridge agent is configured at a point in time selected from the group consisting of: at time of fabrication of the bridge agent, at a power up, at a reset, at an initialization prior to normal operation for the bridge agent, and dynamically during normal operation for the bridge agent.

30. A method comprising:
creating a first link between a first interconnect and a bridge agent;
creating a second link between a second interconnect and the bridge agent; and
configuring the bridge agent to communicate between the first link and the second link, wherein the bridge agent is further configured for topology and flooding control by a parameter selected from the group consisting of: bridge agent, bridge forward, and fully connected.

31. The method of claim 30 wherein configuring further comprises setting parameters selected from a source selected from the group consisting of: the first link, the second link, and a third source.

32. The method of claim 31 wherein configuring further comprises configuring at a point in time selected from the group consisting of: at time of fabrication of the bridge agent, at a power up of the bridge agent, at a reset of the bridge agent, at an initialization prior to normal operation of the bridge agent, and dynamically during normal operation of the bridge agent.

33. A machine-readable medium having stored thereon instructions, which, when executed by a machine, cause the machine to perform the method of claim 30.

34. The method of claim 30 further comprising:
receiving a request;
determining if the request is from an external bridge agent that resides on a neighboring interconnect; and
if so, then
not looping back to the sender; and
sending the request to an internal agent that resides on a same interconnect;
if not, then
determining if the request is from a non-bridge agent that resides on a same interconnect; and
if so, then
forwarding the request to a connected external bridge agent that resides on a neighboring interconnect;
if not, then
determining if a bridge forward parameter is set to no; and
if so, then
doing nothing;
if not, then
forwarding the request to a connected external bridge agent that resides on a neighboring interconnect.

35. A machine-readable medium having stored thereon instructions, which, when executed by a machine, cause the machine to perform the method of claim 34.

36. The method of claim 30 further comprising:
creating a third link between a first agent connected to the first interconnect and a second agent connected to the second interconnect;
querying by the first agent as to the second agent's communication capabilities;
querying by the second agent as to the first agent's communication capabilities; and
configuring the first agent and the second agent to communicate.

37. The method of claim 36 wherein configuring further comprises setting parameters selected from the group consisting of address width, data width, command width, communication timing, receive only, transmit only, bidirectional, bridge, bridge agent, bridge proxy, internetworking proxy, reset, timer, administrator, bridge agent, bridge forward, fully connected, clock rate, reset into bridge X, performance enhance on/off, phase to phase delay, maximum request to data delay, minimum request to response delay, and maximum outstanding requests.

38. The method of claim 37 wherein configuring further comprises configuring at a point in time selected from the group consisting of at time of fabrication of an agent, at a power up of an agent, at a reset of an agent, at an initialization prior to normal operation of an agent, and dynamically during normal operation of an agent.

39. A machine-readable medium having stored thereon instructions, which, when executed by a machine, cause the machine to perform the method of claim 36.

40. A processing system, comprising:
a processor,to execute software instructions from a plurality of software structures, including:
a first software structure with code to create a first link between a first interconnect and a bridge agent;
a second software structure with code to create a second link between a second interconnect and the bridge agent; and
a third software structure with code to configure the bridge agent to communicate between the first link and the second link, wherein the bridge agent is further configured for topology and flooding control by a parameter selected from the group consisting of: bridge agent, bridge forward, and fully connected.

41. A processing system, comprising:
a processor to execute software instructions from a plurality of software structures, including:
a first software structure with code to create a first link between a first interconnect and a bridge agent;
a second software structure with code to create a second link between a second interconnect and the bridge agent;
a third software structure with code to configure the bridge agent to communicate between the first link and the second link, wherein the bridge agent is further configured for topology and flooding control by a parameter selected from the group consisting of: bridge agent, bridge forward, and fully connected, wherein the third software structure having an input to receive a request, and
the third software structure having code to determine whether the request is from an external bridge agent that resides on a neighboring interconnect, wherein
if so, then
not looping back to the sender; and
sending the request to an internal agent that resides on a same interconnect;

if not, then
    determining if the request is from a non-bridge agent that resides on a same interconnect; and
        if so, then
            forwarding the request to a connected external bridge agent that resides on a neighboring interconnect;
        if not, then
            determining if a bridge forward parameter is set to no; and
                if so, then
                    doing nothing;
                not then
                    forwarding the request to a connected external bridge agent that resides on a neighboring interconnect.

42. A processing system, comprising:

a processor to execute software instructions from a plurality of software structures, including:

a first software structure with code to create a first link between a first interconnect and a bridge agent;

a second software structure with code to create a second link between a second interconnect and the bridge agent;

a third software structure with code to configure the bridge agent to communicate between the first link and the second link, wherein the bridge agent is further configured for topology and flooding control by a parameter selected from the group consisting of: bridge agent, bridge forward, and fully connected;

a fourth software structure with code to create a third link between a first agent connected to the first interconnect and a second agent connected to the second interconnect;

a fifth software structure with code to cause the first agent to query as to the second agent's communication capabilities;

a sixth software structure with code to cause the second agent to query as to the first agent's communication capabilities; and a seventh software structure with code to configure the first agent and the second agent to communicate.

* * * * *